(12) United States Patent
Robinson et al.

(10) Patent No.: US 12,340,632 B2
(45) Date of Patent: Jun. 24, 2025

(54) PROVIDING TOLL SERVICE FOR A VEHICLE INCLUDING AN ON-BOARD UNIT

(71) Applicant: ATS TOLLING LLC, Mesa, AZ (US)

(72) Inventors: Benjamin P. Robinson, Lago Vista, TX (US); Sarath K. Balachandran, Irving, TX (US)

(73) Assignee: AMERICAN TRAFFIC SOLUTIONS CONSOLIDATED, L.L.C., Mesa, AZ (US)

( * ) Notice: Subject to any disclaimer, the term of this patent is extended or adjusted under 35 U.S.C. 154(b) by 0 days.

(21) Appl. No.: 17/804,370

(22) Filed: May 27, 2022

(65) Prior Publication Data

US 2023/0010154 A1    Jan. 12, 2023

Related U.S. Application Data

(63) Continuation of application No. 16/241,152, filed on Jan. 7, 2019, now abandoned, which is a continuation of application No. 14/994,524, filed on Jan. 13, 2016, now Pat. No. 10,176,646, which is a continuation of application No. 14/169,295, filed on Jan. 31, 2014, now Pat. No. 9,418,487, which is a continuation of application No. 11/644,261, filed on Dec. 22, 2006, now Pat. No. 8,768,754.

(60) Provisional application No. 60/757,405, filed on Jan. 9, 2006, provisional application No. 60/757,347, filed on Jan. 9, 2006.

(51) Int. Cl.
*G06Q 30/04* (2012.01)
*G06Q 30/0645* (2023.01)
*G07B 15/06* (2011.01)

(52) U.S. Cl.
CPC .......... *G07B 15/063* (2013.01); *G06Q 30/04* (2013.01); *G06Q 30/0645* (2013.01); *G07B 15/06* (2013.01)

(58) Field of Classification Search
CPC .................................................. G07B 15/063
USPC ........................................................ 705/13
See application file for complete search history.

(56) References Cited

U.S. PATENT DOCUMENTS

| | | |
|---|---|---|
| 708,070 A | 9/1902 | Pickard |
| 4,510,495 A | 4/1985 | Sigrimis et al. |
| 4,546,241 A | 10/1985 | Walton |

(Continued)

FOREIGN PATENT DOCUMENTS

| | | |
|---|---|---|
| CA | 2636507 A1 | 7/2007 |
| EP | 0780801 A1 | 6/1997 |

(Continued)

OTHER PUBLICATIONS

Germany Launches GPS-Aided Toll System. vol. 16. Cleveland: North Coast Media, LLC, 2005. Print. (Year: 2005).*

(Continued)

*Primary Examiner* — Akiba K Robinson
(74) *Attorney, Agent, or Firm* — Dorsey & Whitney LLP

(57) ABSTRACT

A system, method, and computer readable medium for toll service activation using an on-board unit in a third party transport comprises, a third party entity, a toll rental entity, and an on-board unit communicably coupled to the third party entity and to the toll rental entity, wherein the on-board unit, receives a position signal, initiates a toll service request, converts the position signal to a toll usage, and stores the position signal, the toll service request and the toll usage.

20 Claims, 12 Drawing Sheets

(56) References Cited

U.S. PATENT DOCUMENTS

| | | | |
|---|---|---|---|
| 4,665,395 A | 5/1987 | Van Ness | |
| 5,086,389 A | 2/1992 | Hassett et al. | |
| 5,263,118 A | 11/1993 | Cornelison | |
| 5,310,999 A | 5/1994 | Claus et al. | |
| 5,381,155 A | 1/1995 | Gerber | |
| 5,396,417 A | 3/1995 | Burks et al. | |
| 5,485,520 A | 1/1996 | Chaum et al. | |
| 5,525,991 A | 6/1996 | Nagura et al. | |
| 5,602,919 A | 2/1997 | Hurta et al. | |
| 5,642,419 A | 6/1997 | Rosen | |
| 5,805,209 A | 9/1998 | Yuge et al. | |
| 5,809,480 A | 9/1998 | Chasek | |
| 5,819,234 A * | 10/1998 | Slavin | G06Q 30/0284 235/375 |
| 5,825,007 A | 10/1998 | Jesadanont | |
| D403,856 S | 1/1999 | Dobbins | |
| 5,935,190 A | 8/1999 | Davis et al. | |
| 5,948,038 A | 9/1999 | Daly et al. | |
| 5,991,749 A | 11/1999 | Morrill, Jr. | |
| 6,052,068 A | 4/2000 | Price et al. | |
| 6,087,963 A | 7/2000 | Kobayashi et al. | |
| 6,111,523 A | 8/2000 | Mee | |
| 6,163,277 A | 12/2000 | Gehlot | |
| 6,175,800 B1 | 1/2001 | Mori et al. | |
| 6,181,259 B1 | 1/2001 | Yamashita et al. | |
| 6,191,705 B1 | 2/2001 | Oomen et al. | |
| 6,195,019 B1 | 2/2001 | Nagura | |
| 6,198,913 B1 | 3/2001 | Sung et al. | |
| 6,198,987 B1 | 3/2001 | Park et al. | |
| 6,218,963 B1 | 4/2001 | Kawanabe et al. | |
| 6,233,519 B1 | 5/2001 | Yamada | |
| 6,243,029 B1 | 6/2001 | Tomer | |
| 6,252,523 B1 | 6/2001 | Mostrom | |
| 6,252,524 B1 | 6/2001 | Takikita | |
| 6,275,552 B1 | 8/2001 | Ando | |
| 6,278,935 B1 | 8/2001 | Kaplan et al. | |
| 6,285,858 B1 | 9/2001 | Yoshida | |
| 6,300,882 B1 | 10/2001 | Inoue | |
| 6,308,893 B1 | 10/2001 | Waxelbaum et al. | |
| 6,317,721 B1 | 11/2001 | Hurta et al. | |
| 6,326,900 B2 | 12/2001 | Deline et al. | |
| 6,337,639 B1 | 1/2002 | Kojima | |
| 6,340,934 B1 | 1/2002 | Hisada | |
| 6,340,935 B1 | 1/2002 | Hall | |
| 6,342,844 B1 | 1/2002 | Rozin | |
| 6,344,806 B1 | 2/2002 | Katz | |
| 6,347,739 B1 | 2/2002 | Tamam | |
| 6,373,402 B1 | 4/2002 | Mee | |
| 6,388,579 B1 | 5/2002 | Adcox | |
| 6,390,365 B1 | 5/2002 | Karasawa | |
| 6,390,429 B1 | 5/2002 | Brincat | |
| 6,396,418 B2 | 5/2002 | Naito | |
| 6,411,889 B1 | 6/2002 | Mizunuma et al. | |
| 6,437,706 B2 | 8/2002 | Sato et al. | |
| 6,446,049 B1 | 9/2002 | Janning et al. | |
| 6,449,555 B1 | 9/2002 | Ohba et al. | |
| 6,459,385 B2 | 10/2002 | Yamashita | |
| 6,463,384 B1 | 10/2002 | Kaplan et al. | |
| 6,490,443 B1 | 12/2002 | Freeny, Jr. | |
| 6,509,843 B1 | 1/2003 | Fuyama | |
| 6,538,580 B2 | 3/2003 | Boström et al. | |
| 6,542,815 B1 | 4/2003 | Ishizaki et al. | |
| 6,546,119 B2 | 4/2003 | Ciolli et al. | |
| 6,587,755 B1 | 7/2003 | Smith et al. | |
| 6,603,406 B2 | 8/2003 | Jambhekar et al. | |
| 6,642,851 B2 | 11/2003 | Deline et al. | |
| 6,653,946 B1 | 11/2003 | Hassett | |
| 6,658,392 B2 | 12/2003 | Yoshida | |
| 6,658,775 B1 | 12/2003 | Lanzisero | |
| 6,661,352 B2 | 12/2003 | Tiernay et al. | |
| 6,683,580 B2 | 1/2004 | Kuramoto | |
| 6,683,956 B1 | 1/2004 | Aikawa et al. | |
| 6,684,155 B1 | 1/2004 | Chen et al. | |
| 6,705,521 B1 | 3/2004 | Wu et al. | |
| 6,725,202 B1 | 4/2004 | Hurta et al. | |
| 6,737,986 B2 | 5/2004 | Fuyama | |
| 6,744,377 B1 | 6/2004 | Inoue | |
| 6,754,369 B1 | 6/2004 | Sazawa | |
| 6,756,915 B2 | 6/2004 | Choi | |
| 6,774,810 B2 | 8/2004 | Deline et al. | |
| 6,791,475 B2 | 9/2004 | Yamashita | |
| 6,796,499 B1 | 9/2004 | Wang | |
| 6,816,707 B1 | 11/2004 | Barker | |
| 6,834,267 B1 | 12/2004 | Fuyama | |
| 6,856,820 B1 | 2/2005 | Kolls | |
| 6,883,710 B2 | 4/2005 | Chung | |
| D505,916 S | 6/2005 | Hilton | |
| 6,904,362 B2 | 6/2005 | Nakashima et al. | |
| 6,909,876 B2 | 6/2005 | Higashino et al. | |
| 6,920,379 B2 | 7/2005 | Miyamoto | |
| 6,937,162 B2 | 8/2005 | Tokitsu et al. | |
| 6,965,438 B2 | 11/2005 | Lee et al. | |
| 6,966,489 B2 | 11/2005 | Grant | |
| 6,985,827 B2 | 1/2006 | Williams et al. | |
| 6,985,931 B2 | 1/2006 | Dowling | |
| 6,999,001 B2 | 2/2006 | Kojima | |
| 7,019,670 B2 | 3/2006 | Bahar | |
| 7,053,793 B2 | 5/2006 | Tajima et al. | |
| 7,080,070 B1 | 7/2006 | Gavarini | |
| 7,104,447 B1 | 9/2006 | Lopez et al. | |
| D535,722 S | 1/2007 | Nimberger | |
| 7,501,961 B2 | 3/2009 | Robinson et al. | |
| 7,676,392 B2 | 3/2010 | Hedley et al. | |
| 7,774,228 B2 | 8/2010 | Robinson et al. | |
| 7,874,482 B2 | 1/2011 | Mitschele | |
| 7,970,644 B2 | 6/2011 | Hedley et al. | |
| 8,195,506 B2 | 6/2012 | Robinson et al. | |
| 8,363,899 B2 | 1/2013 | Balachandran | |
| 8,374,909 B2 | 2/2013 | Robinson et al. | |
| 8,473,332 B2 | 6/2013 | Robinson et al. | |
| 8,473,333 B2 | 6/2013 | Robinson et al. | |
| D704,243 S | 5/2014 | Ikegame | |
| 8,738,525 B2 | 5/2014 | Balachandran | |
| 8,744,905 B2 | 6/2014 | Robinson et al. | |
| 8,768,754 B2 | 7/2014 | Robinson et al. | |
| D728,481 S | 5/2015 | Schulte | |
| 9,109,911 B2 | 8/2015 | Rice et al. | |
| 2001/0019307 A1 | 9/2001 | Sato et al. | |
| 2001/0025251 A1 | 9/2001 | Konishi et al. | |
| 2001/0026228 A1 | 10/2001 | Naito | |
| 2001/0052880 A1 | 12/2001 | Kuramoto | |
| 2002/0002534 A1 | 1/2002 | Davis | |
| 2002/0004741 A1 | 1/2002 | Yoshida | |
| 2002/0008638 A1 | 1/2002 | Yamashita | |
| 2002/0018005 A1 | 2/2002 | Fuyama | |
| 2002/0032506 A1 | 3/2002 | Tokitsu | |
| 2002/0046128 A1 | 4/2002 | Abe et al. | |
| 2002/0052837 A1 | 5/2002 | Bouthors | |
| 2002/0067291 A1 | 6/2002 | Ikeda | |
| 2002/0072963 A1 | 6/2002 | Jonge | |
| 2002/0080048 A1 | 6/2002 | Choi | |
| 2002/0089431 A1 | 7/2002 | Fuyama | |
| 2002/0097178 A1 | 7/2002 | Thomas et al. | |
| 2002/0105440 A1 | 8/2002 | Bostrom et al. | |
| 2002/0111851 A1 | 8/2002 | Folkers | |
| 2002/0115410 A1 | 8/2002 | Higashino et al. | |
| 2002/0145039 A1 | 10/2002 | Carroll | |
| 2002/0145542 A1 | 10/2002 | Yamashita | |
| 2002/0178050 A1 | 11/2002 | Sone | |
| 2002/0186144 A1 | 12/2002 | Meunier | |
| 2002/0194137 A1 | 12/2002 | Park et al. | |
| 2002/0198767 A1 | 12/2002 | Kim | |
| 2003/0001755 A1 | 1/2003 | Tiernay et al. | |
| 2003/0026430 A1 | 2/2003 | Aikawa et al. | |
| 2003/0033083 A1 | 2/2003 | Nakashima et al. | |
| 2003/0046145 A1 | 3/2003 | Miao | |
| 2003/0050038 A1 | 3/2003 | Haave et al. | |
| 2003/0067396 A1 * | 4/2003 | Hassett | G07C 5/008 340/8.1 |
| 2003/0069784 A1 | 4/2003 | Banerjee et al. | |
| 2003/0098800 A1 | 5/2003 | Jambhekar et al. | |
| 2003/0105662 A1 | 6/2003 | Koketsu et al. | |
| 2003/0109223 A1 | 6/2003 | Toyama | |
| 2003/0110075 A1 | 6/2003 | Shioda et al. | |

(56) References Cited

U.S. PATENT DOCUMENTS

| | | |
|---|---|---|
| 2003/0112125 A1 | 6/2003 | Saegrov |
| 2003/0115095 A1 | 6/2003 | Yamauchi |
| 2003/0125981 A1 | 7/2003 | Pedrazzoli Pazos |
| 2003/0189498 A1 | 10/2003 | Kakihara et al. |
| 2003/0200227 A1 | 10/2003 | Ressler |
| 2004/0004120 A1 | 1/2004 | Kojima |
| 2004/0008514 A1 | 1/2004 | Lee et al. |
| 2004/0019412 A1 | 1/2004 | Miyamoto |
| 2004/0046019 A1 | 3/2004 | Kojima |
| 2004/0068433 A1 | 4/2004 | Chatterjee et al. |
| 2004/0083130 A1 | 4/2004 | Posner et al. |
| 2004/0140355 A1 | 7/2004 | Grison |
| 2004/0146272 A1 | 7/2004 | Kessel et al. |
| 2004/0153401 A1 | 8/2004 | Gila et al. |
| 2004/0161097 A1 | 8/2004 | Henry |
| 2004/0162788 A1 | 8/2004 | Sakamoto |
| 2004/0174272 A1 | 9/2004 | Lin |
| 2004/0178929 A1 | 9/2004 | Toyama |
| 2004/0206817 A1 | 10/2004 | Grant |
| 2004/0212518 A1 | 10/2004 | Tajima et al. |
| 2004/0227616 A1 | 11/2004 | Lafferty |
| 2004/0236685 A1 | 11/2004 | Gila |
| 2004/0245302 A1 | 12/2004 | McNicholas |
| 2004/0263356 A1 | 12/2004 | Wu et al. |
| 2004/0266500 A1 | 12/2004 | Gila et al. |
| 2005/0005488 A1 | 1/2005 | Burke |
| 2005/0010478 A1 | 1/2005 | Gravelle |
| 2005/0033505 A1 | 2/2005 | Zatz |
| 2005/0034340 A1 | 2/2005 | Burke |
| 2005/0040221 A1 | 2/2005 | Schwarz |
| 2005/0071175 A1 | 3/2005 | Gila |
| 2005/0075836 A1 | 4/2005 | Taylor |
| 2005/0086100 A1 | 4/2005 | Yanagisawa et al. |
| 2005/0097018 A1 | 5/2005 | Takida |
| 2005/0102211 A1 | 5/2005 | Freeny, Jr. |
| 2005/0116838 A1 | 6/2005 | Bachelder et al. |
| 2005/0119010 A1 | 6/2005 | Yasukawa |
| 2005/0157677 A1 | 7/2005 | Dowling |
| 2005/0159133 A1 | 7/2005 | Hasan et al. |
| 2005/0168351 A1 | 8/2005 | Saze et al. |
| 2005/0168352 A1 | 8/2005 | Tomer |
| 2005/0169227 A1 | 8/2005 | Dowling |
| 2005/0169228 A1 | 8/2005 | Dowling |
| 2005/0170824 A1 | 8/2005 | Dowling |
| 2005/0170825 A1 | 8/2005 | Dowling |
| 2005/0179522 A1 | 8/2005 | Saegrov |
| 2005/0187701 A1 | 8/2005 | Baney |
| 2005/0195841 A1 | 9/2005 | Dowling |
| 2005/0195842 A1 | 9/2005 | Dowling |
| 2005/0197976 A1* | 9/2005 | Tuton .............. G06Q 30/0284 705/417 |
| 2005/0198199 A1 | 9/2005 | Dowling |
| 2005/0203892 A1 | 9/2005 | Wesley et al. |
| 2005/0216187 A1 | 9/2005 | Hartinger |
| 2005/0270178 A1 | 12/2005 | Ioli |
| 2005/0279831 A1 | 12/2005 | Robinson et al. |
| 2006/0041513 A1 | 2/2006 | Yuhara et al. |
| 2006/0142933 A1 | 6/2006 | Feng |
| 2006/0143104 A1 | 6/2006 | Wagonheim |
| 2006/0237528 A1 | 10/2006 | Bishop et al. |
| 2006/0289621 A1 | 12/2006 | Foss et al. |
| 2007/0026842 A1 | 2/2007 | Haave et al. |
| 2007/0100745 A1 | 5/2007 | Keiser et al. |
| 2007/0124197 A1 | 5/2007 | Robinson et al. |
| 2007/0124198 A1 | 5/2007 | Robinson et al. |
| 2007/0124199 A1 | 5/2007 | Robinson et al. |
| 2007/0126601 A1 | 6/2007 | Park |
| 2007/0192177 A1 | 8/2007 | Robinson et al. |
| 2007/0252678 A1 | 11/2007 | Garcia Alonso et al. |
| 2007/0255653 A1 | 11/2007 | Tumminaro et al. |
| 2007/0265872 A1 | 11/2007 | Robinson et al. |
| 2007/0285279 A1 | 12/2007 | Robinson et al. |
| 2007/0285280 A1 | 12/2007 | Robinson et al. |
| 2007/0299721 A1 | 12/2007 | Robinson et al. |
| 2008/0040210 A1 | 2/2008 | Hedley |
| 2008/0062009 A1 | 3/2008 | Marton |
| 2008/0062472 A1 | 3/2008 | Garg et al. |
| 2008/0077417 A1 | 3/2008 | Lazzarino et al. |
| 2008/0120172 A1 | 5/2008 | Robinson et al. |
| 2008/0147491 A1 | 6/2008 | Robinson et al. |
| 2008/0248819 A1 | 10/2008 | Smith et al. |
| 2008/0249936 A1 | 10/2008 | Miller et al. |
| 2008/0270226 A1 | 10/2008 | Archibald |
| 2008/0306868 A1 | 12/2008 | Robinson et al. |
| 2009/0083185 A1 | 3/2009 | Robinson et al. |
| 2009/0089156 A1 | 4/2009 | Robinson et al. |
| 2009/0146845 A1 | 6/2009 | Hedley |
| 2009/0195651 A1 | 8/2009 | Leonard et al. |
| 2009/0222331 A1 | 9/2009 | Robinson et al. |
| 2009/0228350 A1 | 9/2009 | Robinson |
| 2009/0292596 A1 | 11/2009 | Robinson et al. |
| 2009/0292597 A1 | 11/2009 | Schwartz et al. |
| 2010/0023452 A1 | 1/2010 | Brown |
| 2010/0114675 A1 | 5/2010 | Robinson et al. |
| 2010/0123552 A1 | 5/2010 | Kaufman et al. |
| 2010/0153193 A1 | 6/2010 | Ashby et al. |
| 2011/0145086 A1 | 6/2011 | Valdes et al. |
| 2012/0155712 A1 | 6/2012 | Paul et al. |
| 2013/0253997 A1 | 9/2013 | Robinson et al. |
| 2013/0275188 A1 | 10/2013 | Robinson et al. |
| 2014/0019349 A1 | 1/2014 | Balachandran |
| 2014/0025444 A1 | 1/2014 | Willis |
| 2014/0117096 A1 | 5/2014 | Heimlicher |
| 2014/0149190 A1 | 5/2014 | Robinson et al. |
| 2014/0244492 A1 | 8/2014 | Balachandran |
| 2014/0289024 A1 | 9/2014 | Robinson et al. |
| 2015/0048159 A1 | 2/2015 | Martinez De Velasco Cortina et al. |
| 2016/0125665 A1 | 5/2016 | Robinson et al. |

FOREIGN PATENT DOCUMENTS

| | | | |
|---|---|---|---|
| EP | 0784297 | | 1/2000 |
| GB | 2414336 A | | 11/2005 |
| JP | H10289398 A | * | 10/1998 |
| JP | 2001022987 A | * | 1/2001 |
| JP | 2003085604 A | * | 3/2003 |
| JP | 2004213569 A | | 7/2004 |
| JP | 2004227259 | | 8/2004 |
| JP | 3705037 B2 | * | 10/2005 |
| JP | 4120126 B2 | * | 7/2008 |
| WO | 2004010386 A1 | | 1/2004 |
| WO | 2007044960 A2 | | 4/2007 |
| WO | 2007081833 A2 | | 7/2007 |

OTHER PUBLICATIONS

"2004 IBTTA Technology Committee Spring Technology Workshop", Overview of Meeting Proceedings, Miami, Florida, USA, Jun. 13-15, 2004, 4 pages.

Astarita, Vittorio, et al., "The use of Mobile Phones in Traffic Management and Control", IEEE Intelligent Transportation Systems Conference Proceedings—Oakland, CA, Aug. 25-29, 2001, 5 pages.

U.S. Appl. No. 16/241,152, Non-Final Office Action, filed Jun. 28, 2021, 15 pages.

U.S. Appl. No. 16/241,152, Final Office Action, filed Nov. 30, 2021, 19 pages.

07716397.0, Extended European Search Report, Nov. 29, 2010, 8 pages.

U.S. Appl. No. 11/125,521, Non-Final Office Action, filed Jul. 24, 2006, 22 pages.

U.S. Appl. No. 11/125,521, Final Office Action, filed Oct. 23, 2006, 13 pages.

U.S. Appl. No. 11/125,521, Non-Final Office Action, filed Apr. 17, 2007, 13 pages.

U.S. Appl. No. 11/125,521, Final Office Action, filed Nov. 23, 2007, 17 pages.

U.S. Appl. No. 11/125,521, Notice of Allowance, filed Apr. 17, 2008, 17 pages.

(56) References Cited

OTHER PUBLICATIONS

U.S. Appl. No. 11/644,261, Final Office Action, filed Apr. 21, 2010, 21 pages.
U.S. Appl. No. 11/644,261, Non-Final Office Action, filed Apr. 27, 2011, 19 pages.
U.S. Appl. No. 11/644,261, Non-Final Office Action, filed Aug. 19, 2009, 21 pages.
U.S. Appl. No. 11/644,261, Final Office Action, filed Jun. 12, 2012, 20 pages.
U.S. Appl. No. 11/644,261, Notice of Allowance, filed Nov. 7, 2013, 11 pages.
U.S. Appl. No. 11/644,261, Non-Final Office Action, filed Oct. 12, 2011, 24 pages.
U.S. Appl. No. 11/985,985, Non-Final Office Action, filed Sep. 26, 2008, 21 pages.
U.S. Appl. No. 11/985,985, Non-Final Office Action, filed Jul. 7, 2009, 15 pages.
U.S. Appl. No. 11/985,985, Final Office Action, filed Apr. 5, 2010, 20 pages.
U.S. Appl. No. 11/985,985, Notice of Allowance, filed Mar. 25, 2013, 19 pages.
U.S. Appl. No. 12/437,782, Non-Final Office Action, filed Jan. 18, 2012, 23 pages.
U.S. Appl. No. 12/437,782, Final Office Action, filed Oct. 15, 2012, 24 pages.
U.S. Appl. No. 12/437,782, Notice of Allowance, filed Mar. 27, 2013, 13 pages.
U.S. Appl. No. 13/737,272, Non-Final Office Action, filed Oct. 7, 2014, 20 pages.
U.S. Appl. No. 13/737,272, Final Office Action, filed Feb. 10, 2015, 7 pages.
U.S. Appl. No. 13/737,272, Non-Final Office Action, filed Oct. 28, 2015, 6 pages.
U.S. Appl. No. 13/737,272, Final Office Action, filed Apr. 27, 2016, 7 pages.
U.S. Appl. No. 13/737,272, Notice of Allowance, filed Mar. 6, 2017, 9 pages.
U.S. Appl. No. 13/894,501, Non-Final Office Action, filed Sep. 7, 2016, 16 pages.
U.S. Appl. No. 13/894,501, Final Office Action, filed Apr. 13, 2017, 36 pages.
U.S. Appl. No. 13/894,501, Non-Final Office Action, filed Sep. 22, 2017, 35 pages.
U.S. Appl. No. 13/894,501, Final Office Action, filed Apr. 5, 2018, 28 pages.
U.S. Appl. No. 13/894,501, Non-Final Office Action, filed Feb. 5, 2019, 32 pages.
U.S. Appl. No. 13/894,501, Final Office Action, filed Aug. 1, 2019, 7 pages.
U.S. Appl. No. 13/894,501, Notice of Allowance, filed Feb. 10, 2020, 12 pages.
U.S. Appl. No. 14/169,295, Final Office Action, filed Feb. 9, 2015, 7 pages.
U.S. Appl. No. 14/169,295, Notice of Allowance, filed Jun. 1, 2016, 12 pages.
U.S. Appl. No. 14/169,295, Notice of Allowance, filed Nov. 12, 2015, 16 pages.
U.S. Appl. No. 14/169,295, Non-Final Office Action, filed Oct. 7, 2014, 5 pages.
U.S. Appl. No. 14/244,023, Non-Final Office Action, filed Sep. 14, 2017, 21 pages.
U.S. Appl. No. 14/244,023, Final Office Action, filed Apr. 10, 2018, 21 pages.
U.S. Appl. No. 14/268,357, Non-Final Office Action, filed May 31, 2017, 16 pages.
U.S. Appl. No. 14/268,357, Final Office Action, filed Sep. 25, 2017, 23 pages.
U.S. Appl. No. 14/471,300, Non-Final Office Action, filed Apr. 21, 2017, 53 pages.
U.S. Appl. No. 14/471,300, Final Office Action, filed Oct. 16, 2017, 33 pages.
U.S. Appl. No. 14/471,300, Non-Final Office Action, filed Jul. 10, 2018, 29 pages.
U.S. Appl. No. 14/994,524, Notice of Allowance, filed Oct. 18, 2018, 9 pages.
U.S. Appl. No. 15/616,816, Final Office Action, 31 pages.
U.S. Appl. No. 15/616,816, Non-Final Office Action, filed Aug. 14, 2019, 22 pages.
Basiri, Anahid, "A novel model blah blah blah", The Journal of Navigation 74:3, Cambridge University Press, Jan. 1, 2021, pp. 501-504.
Connors, Jim, "Security Increasing with Season for Shoplifting", St. Joseph News; St. Joseph, MO, Nov. 30, 2005, 2 pages.
Dewan, Suni G., et al., "Mobile Payment Adoption in the US: A Cross-industry, Cross-platform Solution", Journal of Information Privacy & Security, vol. 1, No. 2, Dec. 31, 2005.
Edge, "Electronic toll collection: AT&T to install system in California", vol. 8, No. 248, Apr. 26, 1993.
Eltis.org, "Toll Ring System", Oslo, Norway (http://www.eltis.org/discover/case-studies/oslo-toll-ring-system), Dec. 27, 2002, 5 pages.
IBM Corp., "Introduction to Republication and Event Publishing", IBM Information Integration, Version 9.5, Jan. 1, 2004, 68 pages.
Ibtta Technology Committee, "Overview of Meeting Proceedings", Spring Technology Workshop, Miami, Florida, USA, Jan. 1, 2004, 4 pages.
Ingenia, "Road Pricing: Addressing Congestion Pollution and the Financing of Brtain S Roads", Issue 29, Dec. 29, 2006, 4 pages.
Karnouskos, et al., "Mobile Payment: a Journey Through Existing Procedures and Standardization Initiatives", IEEE Communications Surveys, The Electronic Magazine of Original Peer- Reviewed Survey Articles, Fourth Quarter 2004, vol. 6, No. 4, Dec. 31, 2004, 23 pages.
Lin, Chin E., et al., "A Mobile Electronic Toll Collection for E-Commerce Applications", Journal of Theoretical and Applied Electronic Commerce Research, vol. 3, Issue 2, Aug. 1, 2008, pp. 111-128.
PCT/US2005/016376, International Search Report and Written Opinion, Aug. 30, 2016, 7 pages.
PCT/US2006/034534, International Search Report and Written Opinion, Sep. 18, 2007, 6 pages.
PCT/US2007/011816, International Search Report and Written Opinion, Jun. 2, 2008, 8 pages.
PCT/US2008/010258, International Search Report and Written Opinion, Nov. 10, 2008, 5 pages.
PCT/US2009/060352, International Search Report and Written Opinion, Dec. 10, 2009, 6 pages.
Proquest, "Dollar and Thrifty Keep Customers Moving with Pass24(TM)", PR Newswire, New York, Sep. 18, 2006, 2 pages.
Schnacke, Dick, "The 5.9 GHZ DSRC Prototype Development Program", IBTTA Technology Workshop, Madrid, Spain, Nov. 14, 2004, 37 pages.
Yee, Sonya, "Iron Curtain Still Bards the Road East", Oct. 19, 1998, 4 pages.

\* cited by examiner

PROVIDING TOLL SERVICE FOR A VEHICLE INCLUDING AN ON-BOARD UNIT

CROSS REFERENCE TO RELATED APPLICATIONS

This application is a continuation of U.S. patent application Ser. No. 14/169,295, filed on Jan. 31, 2014. U.S. patent application Ser. No. 14/169,295 is a continuation of U.S. patent application Ser. No. 11/644,261, filed on Dec. 22, 2006. U.S. patent application Ser. No. 11/644,261 is incorporated herein by reference. U.S. patent application Ser. No. 11/644,261 claims priority from U.S. Provisional Patent Application No. 60/757,347, titled Electronic Toll Payment System And Method For Third Party Operated Vehicles Utilizing An Onboard Unit, filed on Jan. 9, 2006 and claims priority from U.S. Provisional Patent Application No. 60/757,405, titled Gps Toll System And Method For Collection Of Rental Vehicle Tolls, filed on Jan. 9, 2006, the entire contents of each of which is incorporated by reference herein. The present patent application is related to U.S. Provisional Patent Application No. 60/726,300, titled Toll Fee System And Method Using Prepaid Toll Pass, filed on Oct. 13, 2005, U.S. Provisional Patent Application No. 60/759,937, titled Business Process For Toll Fee System And Method For Vehicle Registration, Invoicing, Opt-In Services, And Toll Violations, filed on Jan. 18, 2006, U.S. Provisional Patent Application No. 60/763,097 titled Method And System For Toll Collection With Optional Service Capabilities, filed on Jan. 27, 2006, U.S. Non-Provisional patent application Ser. No. 11/125,521, titled Toll Fee System And Method, filed on May 10, 2005, to U.S. Non-Provisional patent application Ser. No. 11/516,376, titled System, Method, And Computer Readable Medium For Billing, filed on Sep. 6, 2006, to U.S. Non-Provisional patent application Ser. No. 11/516,380, titled System, Method, And Computer Readable Medium For Billing Tolls, filed on Sep. 6, 2006, to U.S. Non-Provisional patent application Ser. No. 11/580,528, titled System, Method And Computer Readable Medium For Toll Service Activation And Billing, filed on Oct. 13, 2006, to U.S. Non-Provisional patent application Ser. No. 11/580,527, titled System, Method And Computer Readable Medium For Billing Based On A Duration Of A Service Period, filed on Oct. 13, 2006, to U.S. Non-Provisional patent application Ser. No. 11/640,550, tilted Paying Tolls Utilizing A Financial Service Provider And Paying A Subscription Or License Fee, filed on Dec. 18, 2006, and to U.S. Non-Provisional patent application Ser. No. 11/640,586, titled Transferring Toll Data From A Third Party Operated Transport To A User Account, filed on Dec. 18, 2006. The entire contents of each of the above-identified applications is incorporated by reference herein.

BACKGROUND OF THE INVENTION

The embodiment of the disclosure is generally related to toll billing and, more specifically to billing a rented third party transport including an on-board unit.

A toll road is a road on which a toll authority collects a fee for use. Two variations of toll roads exist: barrier toll plazas and entry/exit tolls. On a mainline toll system, all vehicles stop at various locations on the highway to pay a toll. While this may save money from the lack of need to construct tolls at every exit, it can cause traffic congestion, and drivers can evade tolls by going around them. With entry/exit tolls, vehicles collect a ticket when entering the highway, which displays the fares it will pay when it exits, increasing in cost for distance traveled. Upon exit, the driver will pay the amount listed for the given exit.

There are an increasing number of toll roads having different toll payment systems, which causes loss of time that could result in arriving late to meetings and missing flights and personal events. Presently, toll booth customers need to carry spare change and/or collect toll receipts for expenses. Additionally, customers could be in the wrong lane, either the exact change lane without the exact change, or in an express lane without a transponder. The embodiment of the disclosure allows a customer to rent a car and travel without dealing with loose change, mandatory cash lanes or toll receipts. The embodiment of the disclosure allows toll fees to be included as part of a rental of a third party transport and consolidation of the toll fees and reduced traffic congestion and vehicle emissions.

The term turnpike refers to the pike or long stick that was held across the road, and only raised or turned aside when the traveler paid the toll. Travelers have disliked toll roads not only for the cost of the toll, but also for the delays at tollbooths.

An adaptation of military "identification friend or foe" or RFID technology, called electronic toll collection, is lessening the delay incurred in toll collection. The electronic system determines whether a passing car is enrolled in the program, alerts enforcers if it is not. The accounts of registered cars are debited automatically without stopping or even opening a window. Other systems are based on GPRS/GSM and GPS technology. One of the advantages of GPS-based systems is their ability to adapt easily and quickly to changes in charge parameters.

Some systems use a small radio transponder mounted in or on a customer's vehicle to deduct toll fares from a pre-paid account as the vehicle passes through the toll barrier. This reduces manpower at tollbooths and increases traffic flow and fuel efficiency by reducing the need for complete stops to pay tolls at these locations.

By designing a tollgate specifically for electronic collection, it is possible to carry out open-road tolling, where the customer does not need to slow at all when passing through the tollgate. The state of Texas is testing a system on a stretch of Texas 121 that has no tollbooths. Drivers without a TollTag have their license plate photographed automatically and the registered owner will receive a monthly bill, at a higher rate than those vehicles with TollTags.

Electronic toll collection (ETC) systems also have drawbacks. A computer glitch can result in delays several miles long. Some state turnpike commissions have found that such a system would be ineffective because most of the people who use the turnpike are not commuters, are from states that have no ETS on turnpikes, or are from states that don't have a turnpike at all. The toll plazas of some turnpikes are antiquated because they were originally built for traffic that stops to pay the toll or get a ticket.

Currently meeting car rental agency and car rental customer needs with respect to toll billing presents difficulties. Currently car rental customers are unable to use the fast toll lanes. The only alternative available to car renters was to line up at tollbooths and wait to pay tolls. Some car renters find themselves under significant time pressure and run the booths, causing problems and expense for toll authorities and car rental agencies. As electronic toll collection technology has improved, toll authorities have begun to hold rental agencies accountable for toll violations.

Therefore, what is needed is a method of utilizing wireless communication between an on-board computer system and road-side or satellite based wireless communication systems in order to make available toll billing to third party operated vehicles. More specifically, what is needed is a method, computer readable media and system for billing a rented third party transport utilizing an on-board unit.

SUMMARY OF THE INVENTION

Rental Car Agency (RCA)

Rental car agencies are commercial entities that rent cars to corporate card holders or financial service customers.

Third Party Entity (TPE)

The third party entity is typically the rental car agency, however in some circumstances it could be a user of a rental agency vehicle or it a fleet vehicle for a university, a trucking company or another fleet vehicle entity.

Toll Rental Entity (TRE)

The toll rental entity is typically a provider of toll rental services to a third party entity and their users, however a toll rental entity could be a rental car agency if the user is the third party entity. The toll rental entity communicates toll data from a toll authority to a third party entity after such toll data has been matched to either plurality of vehicles or users or a single vehicle or user using onboard units. TRE component in the OBU facilities the data transfer between toll authority and third party entity using DSRC or GPS mechanism. The toll data that is communicated will be used for billing purposes of the toll rental entity to the third party entity. More importantly, the toll data is associated with an individual, a company, or plurality of individuals and companies whom are utilizing a fleet vehicle (3.sup.rd party operated vehicle) which the parties do not own or is not owned by the employer. However, there may be instances where the individual does work for the owner of the vehicle. Such situations occur when the individual works directly for the fleet vehicle owner. In this situation the individual or company which employs the individual may bill their own company for the use of the vehicle utilizing the toll services of a Toll Rental Entity. In some circumstances the third party entity may pay a licensing or subscription fee directly to the toll rental entity and the toll rental entity then handles all payments to the toll authority for such toll data accumulated by the third party entity vehicles.

Toll Authority (TA)

Toll authorities are government, quasi-government or private entities that are legally authorized to collect tolls. These entities are required by law to use the collected tolls to build and maintain the roads for which the tolls are collected. When the vehicles uses the toll plaza or toll facility, toll authority sends the toll usage to the on board unit either directly or using TRE. TA optionally sends the transaction details to the TRE and TPE. If the vehicles are registered as toll rental entity vehicle, toll authority charges toll rental entity by duration or by transaction and optionally send the transaction information to the toll rental entity or directly to the third party entity. Any additional evidence or transaction information from toll authority can be provided to third party entity on demand.

Toll Violation and Toll Transactions

If the rental customer or a third party entity chooses to utilize the on-board unit service via, for example, a toll subscription, a duration, a transaction, a location, and the like, then there will be no toll violations to consider because all toll transactions accrued will be billed directly to, for example, a card service provider or covered completely in a license or subscription fee paid directly to the toll rental entity, or in another agreement. However, if customer decides not to use the toll subscription service, and the rental agency utilizes the embodiment of the disclosure, then that customer would then be placed into an Imposed Opt-In and the subscription or license fees associated with the vehicle will be placed onto the customers' bill or charged directly to the third party entity. Toll Violations are identified by vehicle license plates via Optical Character Recognition (OCR), GPS, DSRC and RFID transponders which do not have an active account or service assigned to the recognition device.

Rental Agreement Number (RAN)

When a person rents a car, they sign a rental agreement with the third party entity, which in this case is the rental car agency. A rental agreement number uniquely identifies each rental agreement and third party operator, user, and/or renter. The rental agreement number is an ideal reference to attach a car renter with the toll service. The rental agreement number is a reference number used between rental car agency or third party entity and the on board unit. A customer or renter can activate the toll service subscription through the TPE or via the OBU. The OBU sends the activation information to the TPE and optionally to the TRE. When the renter subscribes for the toll service, a signal activation will be sent to the OBU from the TPE optionally though the TRE. There can be multiple sessions of the rental stored in the OBU database. The OBU associates the toll usage collected from the toll authority or toll authority road side units with the rental sessions.

When the car renter or user chooses to utilize the on-board unit for toll service or the third party entity determines to subscribe all fleet transports to the toll service, the third party entity sends details to the toll authority via the on board unit for the toll authority to bill tolls to the toll rental entity. When a rental vehicle crosses a tollgate, the toll authority system captures the vehicle identification in the toll plaza via the on board unit. If the OBU is in the toll rental entity vehicle database, the toll authority saves the toll usage information. The toll rental entity may match tolls against their registered fleet for payment or the toll rental entity may match tolls against the third party entity user database for payment of tolls. The OBU updates the toll usage database by receiving the information from the Toll Authority through the road site unit or from the TRE.

During toll service, an OBU to captures the rental vehicle information and the toll rental entity will confirm that any vehicle that is captured is a toll service subscriber and then charge the third party entity for the tolls used. In another embodiment the toll rental entity may have already collected a subscription or license fee prior to a rental period and thus no additional billing to the third party entity is required. In such embodiment, the toll rental entity may bill a subscription or license fee for a period and use such fees to pay the toll authority for any accrued toll charges by the vehicles that have subscribed for service from the toll rental entity.

The on board unit may update the toll service request to the toll authority. The embodiment of the disclosure may notify either the third party entity or the toll authority of the service request with vehicle information, start date, expected end date and any other required information and receive toll usage from the toll authority for the service period. The embodiment of the disclosure receives toll usage data from the toll authority, log the transactions and update the status.

When the car renter returns the vehicle to the third party entity, the third party entity notifies the embodiment of the disclosure with the end transaction. At the conclusion of the rental period the embodiment of the disclosure may pass the end date to the toll authority to inform that the account or service period for the rental car should be closed. The OBU sends the toll usage to the TPE and optionally to the TRE for billing. The OBU closes the service request session once the rental agreement is closed or when the vehicle is returned to the TPE. The customer may choose to close the transaction directly from the OBU interface.

Toll Service Benefits

The toll account service has many benefits extending to the toll authority, third party entity, car renter, local drivers and other interested parties. Some of the benefits of toll account assignment include:

eliminating car renter toll violations for rental car agencies that offer the toll subscription service;

eliminating toll violation collection efforts by rental car agencies that offer the toll subscription service;

generating substantial new revenues for rental car agencies and eliminates operational expenses typically spent on tracking down violators; and improving car renter travel experience within toll systems.

In one embodiment of the disclosure the third party entity will have an account containing information pertaining to rental vehicles. This information is necessary due to the movement of rental vehicles between geographical locations; the embodiment of the disclosure requires portions of the complete rental agency fleet to be registered to provide consistent subscription service. If third party entity signs up for toll service then by default all the vehicles registered by the third party entity will be enrolled in the toll rental entity fleet database. When the embodiment of the disclosure moves to a new market, the third party entity can offer car renters toll service for that location without any significant change. The toll rental entity will provide the list of registered vehicles to any participating toll authority for billing the toll rental entity directly for toll usage.

The rental vehicle information and the OBU information is periodically synchronized between the toll service system and third party entity application. This synchronization may occur hourly, daily or nightly using the web service interface or File Transfer Protocol (FTP) service. Whenever vehicles with the OBU are added or removed from the fleet, information is sent from third party entity or a card service provider or financial service provider to the embodiment of the disclosure system. This is the vehicle status update and is initiated by the third party entity, card service provider or financial service provider. Information exchanged between third party entity and toll services application is completed using extensible Markup Language (XML) or FTP file transfer, or may be communicated orally by the user to the toll rental entity.

Billing

In an embodiment of the disclosure, billing can be by one of three major models, a license model in which the toll rental entity pays the Toll Authority for the toll usage by the third party entity vehicle and the toll rental entity sends toll data usage to the third party entity whom charges the customer by duration or rental period. The second major model is subscription in which the toll rental entity pays the Toll Authority for all toll usage but only charges the card service provider, financial service provider or the third party entity for a fixed fee for all toll usage. In this model the Third party entity, card service provider or financial service provider may bill the user of the third party operated vehicle in a manner that they so choose; for example by transaction, by duration or by fixed price increase in the cost of the rental vehicle. The last major billing model is a charge by transaction in which the toll rental entity charges the third party entity for matched toll usages and the customer pays service charges plus the toll usage to the third party entity while renting a vehicle.

In one embodiment of the disclosure, a system for toll service activation using an on-board unit in a third party transport, comprises, a third party entity, a toll rental entity, and an on-board unit communicably coupled to the third party entity and to the toll rental entity, wherein the on-board unit, receives a position signal, initiates a toll service request, converts the position signal to a toll usage, and stores the position signal, the toll service request and the toll usage. The toll rental entity may activate the on-board unit using the toll service request, and a customer may utilize the on-board unit to self-activate the toll service request. The system may also comprise a toll authority communicably coupled to at least one of the toll rental entity and the on-board unit wherein the toll authority captures the toll usage using dedicated short range communication, sends the toll usage to at least one of the toll rental entity and the on-board unit and updates the on-board unit with the toll usage. The third party entity sends a close transaction signal to at least one of the toll rental entity and the on-board unit, the on-board unit closes the toll service request, and the toll rental entity receives the close transaction signal from the third party entity. The on-board unit sends a toll service request activation and on-board unit information to the third party entity, and the communication coupling is via at least one of wireless, and wired, and the sending of information from the on-board unit is via dedicated short range communication or satellite communication via GPS (global positioning satellite). The on-board unit receives a close transaction signal, the on-board unit updates the service request utilizing the close transaction signal, the on-board unit sends the close transaction signal to the third party entity, the third party entity receives the close transaction signal, the onboard unit sends the close transaction signal to the toll rental entity, and the close transaction signal sent to the toll rental entity is at least one of a wireless signal and a wired signal. The toll authority updates the toll usage when the on-board unit is present on a toll road, and the on-board unit stores the toll usage updated by the toll authority.

In another embodiment of the disclosure, a method for billing a rented third party transport including an on-board unit, comprises, receiving a toll usage, sending a payment from a toll rental entity to a toll authority based upon the toll usage, if the toll rental entity charges by a license model, transferring the toll usage to a third party entity, and charging the third party entity for the toll usage by at least one of, a duration, a transaction, and a rental period, if the toll rental entity charges by a subscription model, the onboard unit transferring the toll usage to the toll rental entity, and the toll rental entity charging at least one of the card service provider and third party entity for a fixed fee for the toll usage, and if the toll rental entity charges by a transaction model, transferring the toll usage to the third party entity for a matched toll usage, and charging third party entity by transaction for the matched toll usage. The method may comprise charging the third party entity or another entity or individual additional fees and sending a license fee from the third party entity to the toll rental entity for the toll usage, sending a fixed fee subscription payment from the card service provider or third party entity to the toll rental entity for the toll usage and sending a service charge and toll transaction fees from the third party entity or card service provider to the toll rental entity for the toll usage. In yet another embodiment of the disclosure, a method for billing a rented third party transport including an on-board unit, comprises, receiving a toll usage, sending a payment from a toll rental entity to a toll authority based upon the toll usage or based upon duration, if the toll rental entity charges the third party entity by license: charging a third party entity by a fleet size or a fleet count on at least one of an hourly basis, a daily basis, and a weekly basis, transferring the toll usage to the third party entity as requested periodically; and if the toll rental entity charges the third party entity by duration: grouping by the toll rental entity all of the toll usage by the duration and charging the third party entity by duration; if the toll rental entity charges the third party entity by transaction: charging the third party entity by the toll rental entity with at least one of a service charge and an actual toll usage; and if the toll rental entity charges a customer directly: grouping by the toll rental entity all of the toll usage by the duration and charging the customer by the duration. The method may further comprise, if the toll rental entity charges by transaction then the toll rental entity can apply a service charge and an actual toll usage; sending a license fee from at least one of a third party entity, a card service provider, a financial service provider, a TPE, a travel service provider, and a customer to the toll rental entity for the toll usage; sending a subscription payment from at least one of a card service provider, a financial service provider, a TPE, a travel service provider, and a customer to the toll rental entity for the toll usage; and sending a service charge from the toll rental entity to at least one of a card service provider, a financial service provider, a TPE, a travel service provider, and a customer for the toll usage.

In a further embodiment of the disclosure, a computer readable medium comprises instructions for, installing toll service software component in an on-board unit, receiving by the on-board unit an activation request from at least one of, a customer, a third party entity, and a toll rental entity, receiving by the on-board unit a toll usage from at least one of, a toll authority, and the toll rental entity, and transferring by the on-board unit the toll usage to at least one of, a road side unit, a GPS satellite, another on-board unit, the third party entity, the toll rental entity, and a customer, for billing. The computer readable medium may comprise instructions for managing a plurality of rental agreements, managing a plurality of communication channels, wherein the communication channels comprise at least one of, a dedicated short range communication, and a global positioning system. The computer readable medium may additionally comprise instructions for managing a plurality of sessions and managing a plurality of states. The installation of software on the on board unit may be either a push or pull type of download.

In a first alternate embodiment the third party entity may assign a vehicle according to the toll service request, and send a rental information to the toll rental entity. The toll rental entity may receive the toll service request from at least one of the third party entity and the on-board unit. The toll rental entity stores the toll service request, a toll authority queries the stored toll rental entity for the toll service request and the toll rental entity sends toll usage to the toll rental entity. The toll rental entity may store the toll usage and receive the toll service request. The third party entity may correlate the toll service request to a rental agreement and send the correlated information to the toll rental entity. The toll rental entity may associate the toll service request to a rental agreement, send the toll service request and the toll usage to a toll authority, receive the toll usage from a toll authority and send the toll usage received from the toll authority to the third party entity. The toll usage is sent from the toll rental entity to the third party entity. The third party entity may send an activation request to the on-board unit, receive the toll usage and rental information from the on-board unit and receive the toll usage from the on-board unit.

In a second alternate embodiment a toll based on-board unit, comprises a memory; and a processor communicably coupled to the memory, wherein the processor sends information to a road side unit, global positioning system, or other positioning unit or system related to a third party transport utilizing a toll facility; and receives a toll usage from at least one of a toll authority and a toll rental entity. The on-board unit stores the received toll usage and the information sent by the road side unit includes at least one of, a toll facility location, a time of toll usage, and an on-board unit data set. The toll authority may determine if the on-board unit is a member of a toll rental entity on-board list, store the toll usage and send the toll usage to a toll rental entity.

In a third alternate embodiment a toll based on-board unit, comprising, a memory, and a processor communicably coupled to the memory, wherein the processor, sends information to a road side unit or global positioning system related to a third party transport utilizing a toll facility, and receives the toll usage from a third party entity. The on-board unit stores the received toll usage and the information sent by the road side unit includes at least one of, a toll facility location, a time of toll usage, and an on-board unit data set. The toll authority may determine if the on-board unit is a member of a toll rental entity on-board list, store the toll usage and send the toll usage to a toll rental entity. The toll rental entity may update the toll usage, and store the updated toll usage.

DETAILED DESCRIPTION OF THE INVENTION

Figure 1:
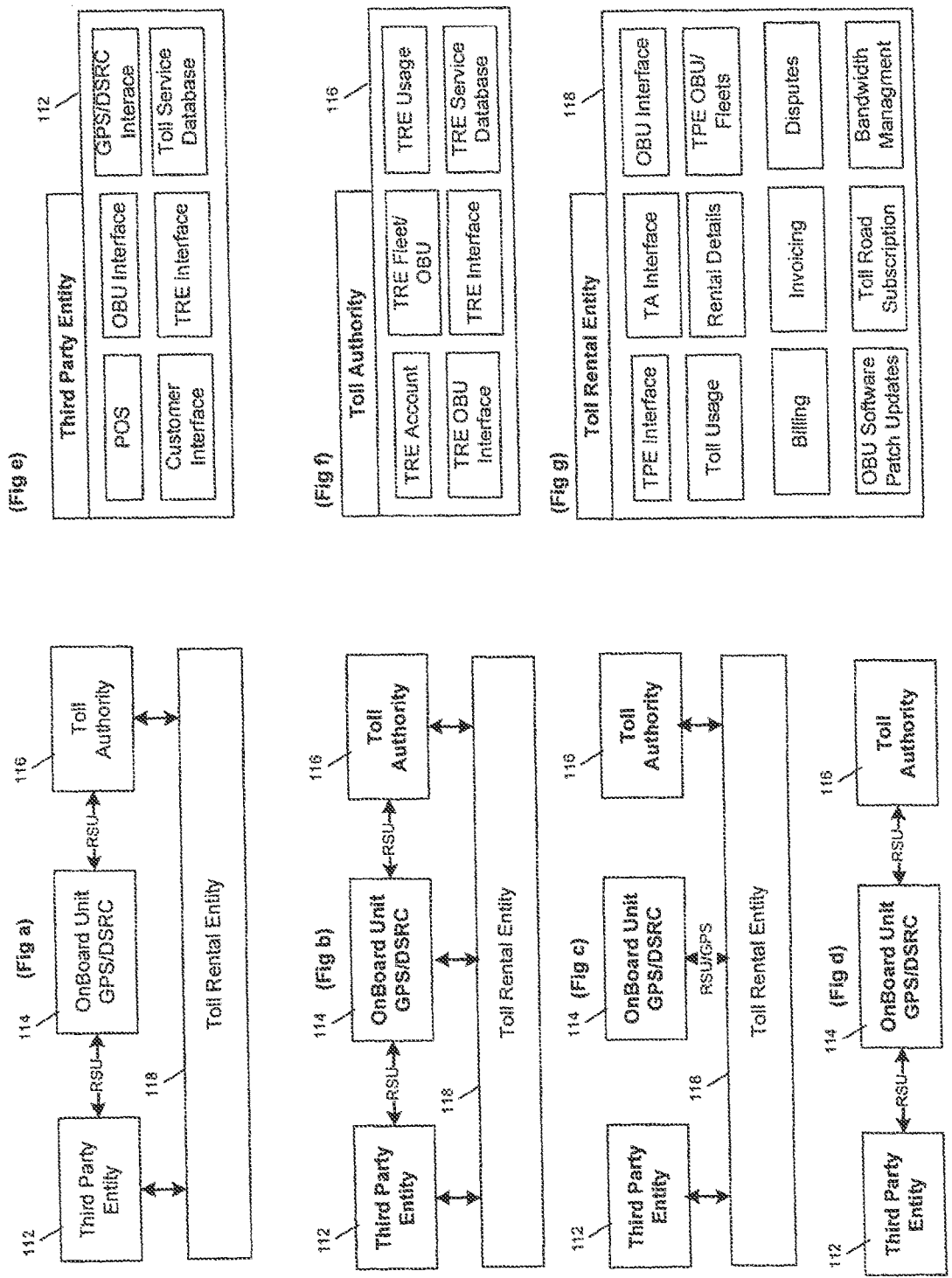
FIG. 1 illustrates an overview of billing a rented third party transport including an onboard unit that includes an embodiment of the disclosure.

Referring now to FIG. 1, an overview of billing a rented third party transport including an on board unit 100 is depicted. A third party entity 112 is in communication with an on board unit 114 which may be a Global Position System (GPS), Dedicated Short Range Communication (DSRC), or other positioning unit or system that is communicating with the third party entity by means of Road Side Unit (RSU), satellite based communication system, or other positioning unit or system. A toll authority 116 is in communication with the on board unit by means of remote sensing unit. Both the third party entity and the toll authority are in communication with a toll rental entity 118. The third party entity is typically a rental car agency but may be an individual. The third party transport would typically be a rental vehicle. The toll rental entity is typically a service provider, however it could be a rental car agency if the user is the third party entity. The toll authority is a government, quasi-government or private entity that is legally authorized to collect tolls. The third party entity may have an OBU, TRE, GPS/DSRC and customer interface a Point Of Sale (POS) interface and an associated toll service database. The Toll authority may have a TRE account, TRE OBU and TRE and TRE Fleet OBU interface, and may also have TRE usage and a TRE service database. The toll rental entity may have a TPE, TA and OBU interface, and have data on toll usage, rental details, TPE OBU fleet details. The toll rental entity may also track billing, invoicing and dispute management. Additionally the toll rental entity may download OBU software patch updates, track toll road subscriptions and manage bandwidth. The transfer of information occurs via at least one of a wireless protocol a wired protocol and a combination of the wireless protocol and the wired protocol. The steps in the flow are performed by software, hardware, firmware, and/or the combination of software, hardware, and/or firmware. FIGS. 1a, 1b, 1c, and 1d represent the possible different models the OBU can communicate with the TPE, TRE and TA.

Figure 2:
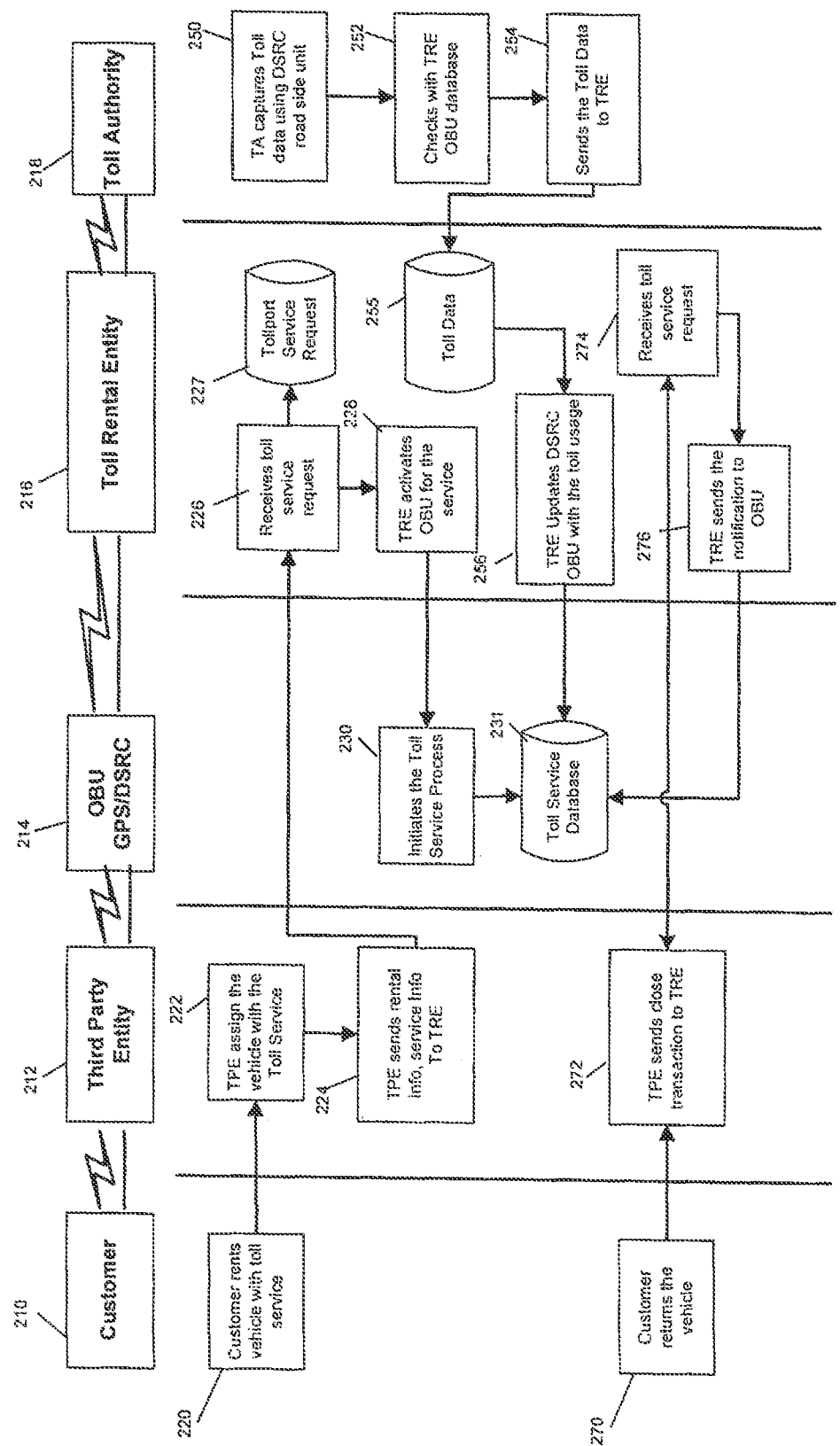
FIG. 2 illustrates a flow chart of a first model of billing a rented third party transport including an onboard unit that includes an embodiment of the disclosure.

Referring now to FIG. 2, a flow chart of a first model of billing a rented third party transport including an on board unit 200 is depicted. Five entities are in communication, a customer 210, a third party entity 212, an on board unit 214, a toll rental entity 216 and a toll authority 218. The third party entity is typically a rental car agency but may be an individual. The toll rental entity is typically a service provider, however it could be a rental car agency if the user is the third party entity. The toll authority is a government, quasi-government or private entity that is legally authorized to collect tolls. The third party transport would typically be a rental vehicle.

The customer rents 220 a vehicle with toll service. The third party entity assigns 222 the vehicle and sends 224 rental and service information to the toll rental entity, which receives the request 226. The received service request is stored 228 by the toll rental entity, which then activates 230 the on board unit for service. The on board unit initiates 232 the toll service process which is stored 234 in the toll service database. The toll authority captures 236 the toll data using a DSRC road side unit, checks 238 with the toll rental entity database and sends 240 the toll data to the toll rental entity. The toll data is stored 242 by the toll rental entity in a toll data database. The toll rental entity updates 244 the DSRC OBU with the toll usage and stores it in the toll service database.

When the customer returns 246 the vehicle, the third party entity sends 248 a close transaction to the toll rental entity. The toll rental entity receives 250 the close transaction and sends 252 the notification to the OBU which updates the toll service database. The transfer of information occurs via at least one of: a wireless protocol, a wired protocol and a combination of the wireless protocol and the wired protocol. The steps in the flow are performed by software, hardware, firmware, and/or the combination of software, hardware, and/or firmware.

Figure 3:
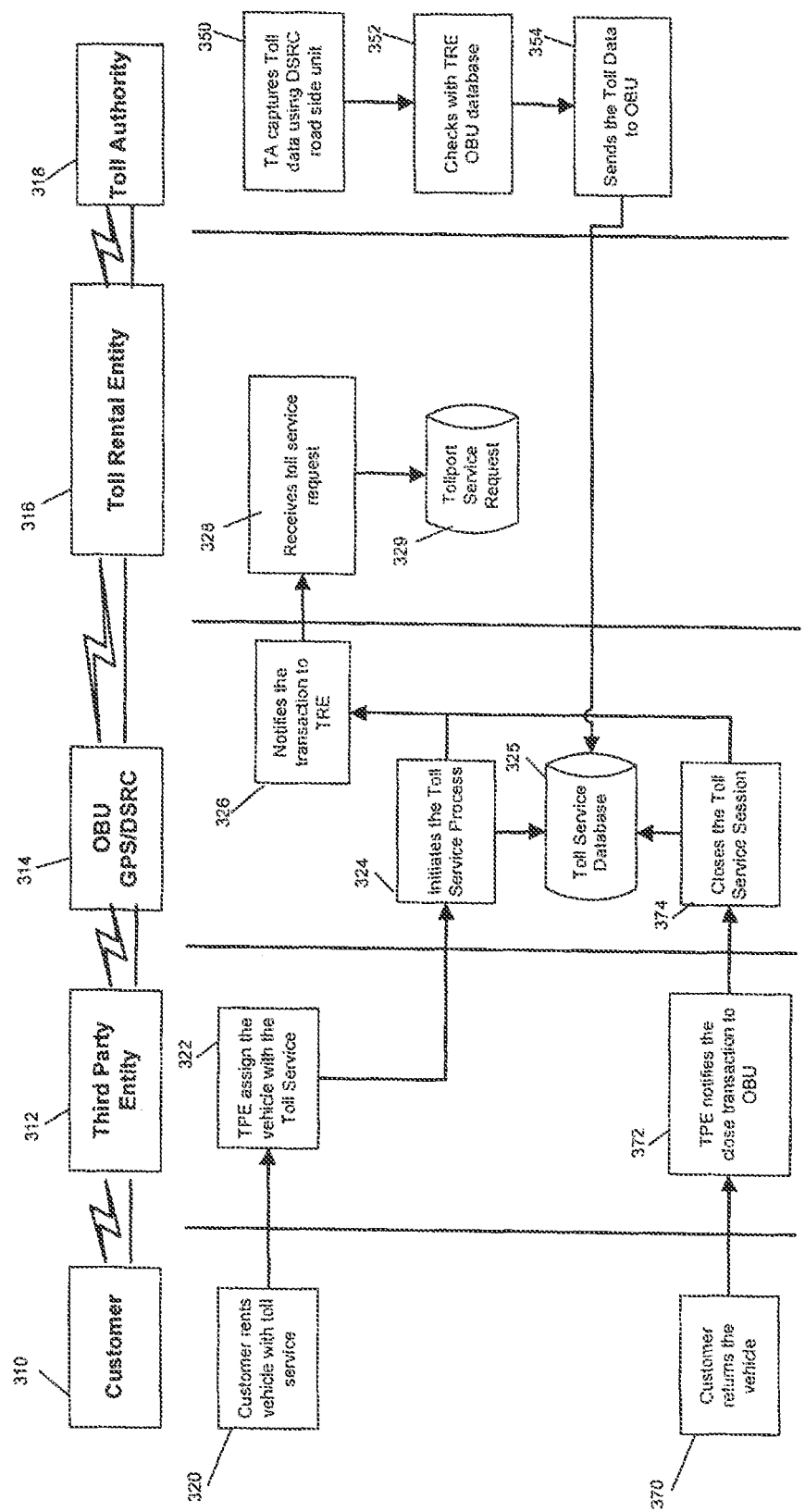
FIG. 3 illustrates a flow chart of a second model billing a rented third party transport including an onboard unit that includes an embodiment of the disclosure.

Referring now to FIG. 3, a flow chart of a first model of billing a rented third party transport including an on board unit 300 is depicted. Five entities are in communication, a customer 310, a third party entity 312, an on board unit 314, a toll rental entity 316 and a toll authority 318. The third party entity is typically a rental car agency but may be an individual. The toll rental entity is typically a service provider, however it could be a rental car agency if the user is the third party entity. The toll authority is a government, quasi-government or private entity that is legally authorized to collect tolls. The third party transport would typically be a rental vehicle.

The customer rents 320 a vehicle with toll service. The third party entity assigns 322 the vehicle with the toll service and initiates 324 the toll service process and stores 326 the request in a toll service database. The OBU notifies 328 the toll rental entity of the action. The toll rental entity receives 330 the toll service request and stores 332 the service request at the toll rental entity. The toll authority captures 334 the toll data using a DSRC road side unit, checks 336 with the toll rental entity database and sends 338 the toll data to the OBU where toll data is stored. The toll rental entity updates the DSRC OBU with the toll usage and stores it in the toll service database.

When the customer returns 340 the vehicle, the third party entity sends 342 a close transaction to the OBU. The OBU receives 344 the close transaction and sends the notification to the toll rental entity. The transfer of information occurs via at least one of a wireless protocol, a wired protocol and a combination of the wireless protocol and the wired protocol. The steps in the flow are performed by software, hardware, firmware, and/or the combination of software, hardware, and/or firmware.

Figure 4:
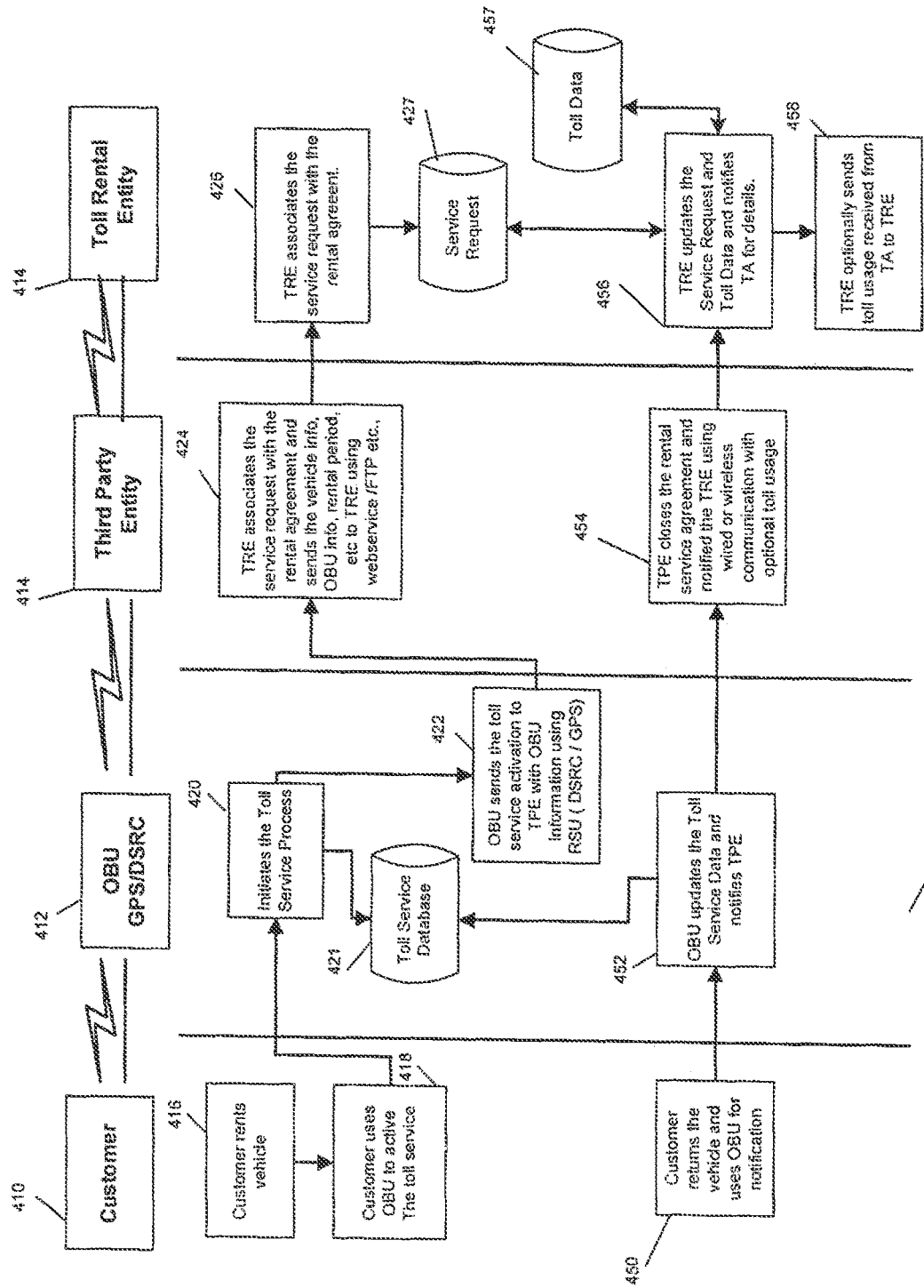
FIG. 4 illustrates a flow chart of toll service activation using an on board unit that includes an embodiment of the disclosure.

Referring now to FIG. 4, a flow chart of toll service activation using an on board unit 400 is depicted. Four entities are in communication, a customer 410, an on board unit 412, a third party entity 414 and a toll rental entity 416. The third party entity is typically a rental car agency but may be an individual. The toll rental entity is typically a service provider, however it could be a rental car agency if the user is the third party entity. The third party transport would typically be a rental vehicle.

The customer rents 418 a vehicle and uses the OBU to activate 420 the toll service. The OBU initiates 422 the toll service process and stores 424 the service request in the toll service database. The OBU sends 426 the toll service activation to the third party entity with OBU information using the road side units with DSCR and GPS. The third party entity associates 428 the service request with the rental agreement and send the vehicle information OBU information and rental period to the toll rental entity using web service or file transfer protocol. The toll rental entity associates 430 the service request with the rental agreement. The service request is stored 432 by the toll rental entity. The toll rental entity updates 434 the service request and toll data and notifies a toll authority with details. The toll rental entity stores 436 the toll data. The toll rental entity may send 438 the toll usage received from the toll authority to the toll rental entity.

When the customer returns 440 the vehicle and uses the OBU for notification. The on board unit updates 442 the toll service data and notifies the third party entity and the third party entity closes 444 the rental agreement and notifies the toll rental entity using wired or wireless communication, which may include toll usage data. The transfer of information occurs via at least one of: a wireless protocol, a wired protocol and a combination of the wireless protocol and the wired protocol. The steps in the flow are performed by software, hardware, firmware, and/or the combination of software, hardware, and/or firmware.

Figure 5:
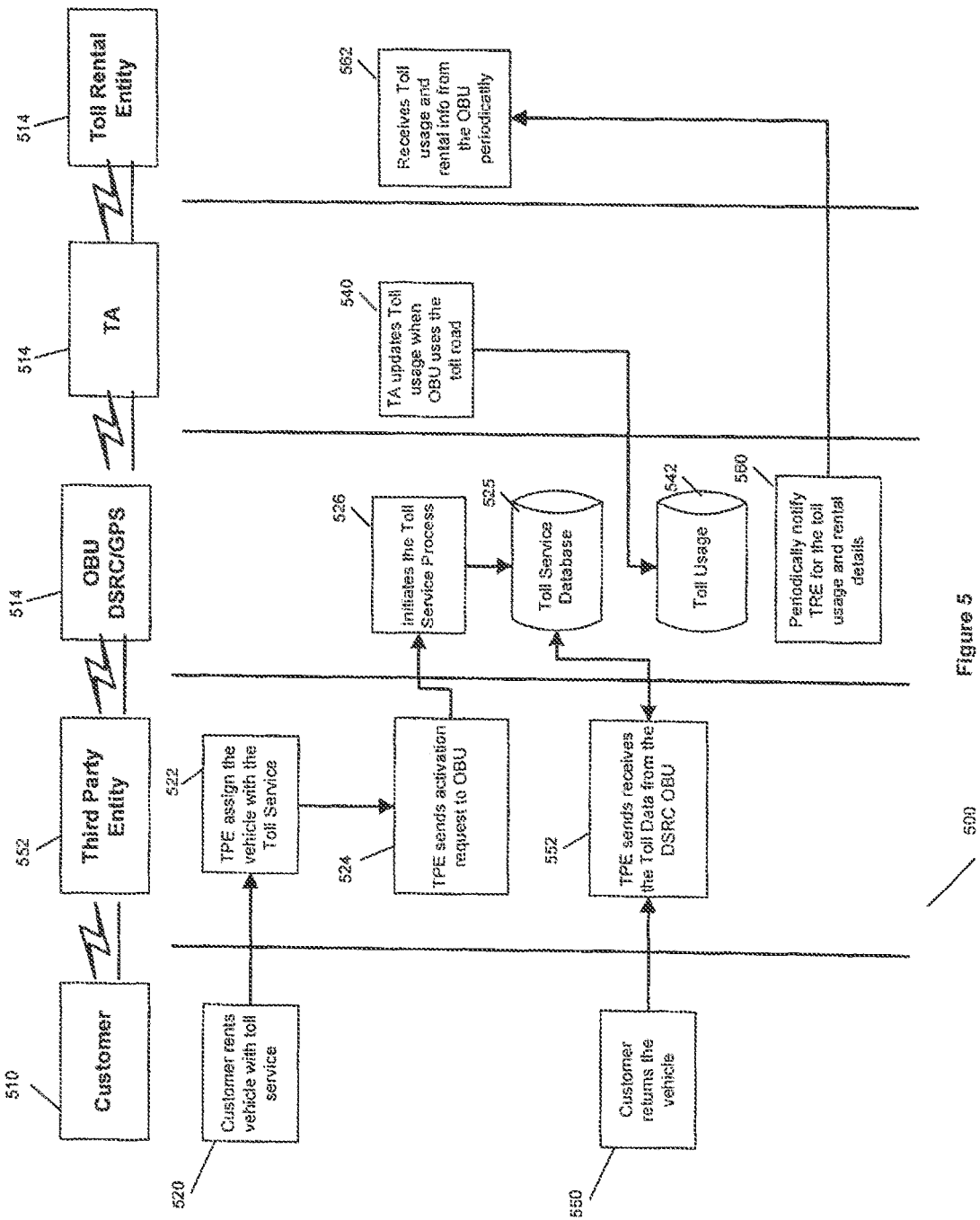
FIG. 5 illustrates a flow chart of toll service activation using a third party entity that includes an embodiment of the disclosure.

Referring now to FIG. 5, a flow chart of toll service activation using a third party entity 500 is depicted. Five entities are in communication, a customer 510, a third party entity 512, an on board unit 514, a toll authority 516 and a toll rental entity 518. The third party entity is typically a rental car agency but may be an individual. The toll rental entity is typically a service provider, however it could be a rental car agency if the user is the third party entity. The third party transport would typically be a rental vehicle.

The customer rents 520 a vehicle with toll service. The third party entity assigns 522 the vehicle with the toll service and sends 524 an activation request to the OBU. The OBU initiates 526 the toll service process and stores 528 the toll service request in the toll service database. A toll authority updates 530 toll usage when the on board unit uses the toll road and stores 532 the toll usage in the OBU toll usage database. The toll rental entity receives 536 toll usage and rental information from the OBU and the OBU notifies 534 the toll rental entity of the toll usage and rental details.

When the customer returns 538 the vehicle, the third party entity receives 540 toll data from the OBU and stores it in the OBU toll service database. The transfer of information occurs via at least one of a wireless protocol, a wired protocol and a combination of the wireless protocol and the wired protocol. The steps in the flow are performed by software, hardware, firmware, and/or the combination of software, hardware, and/or firmware.

Figure 6:
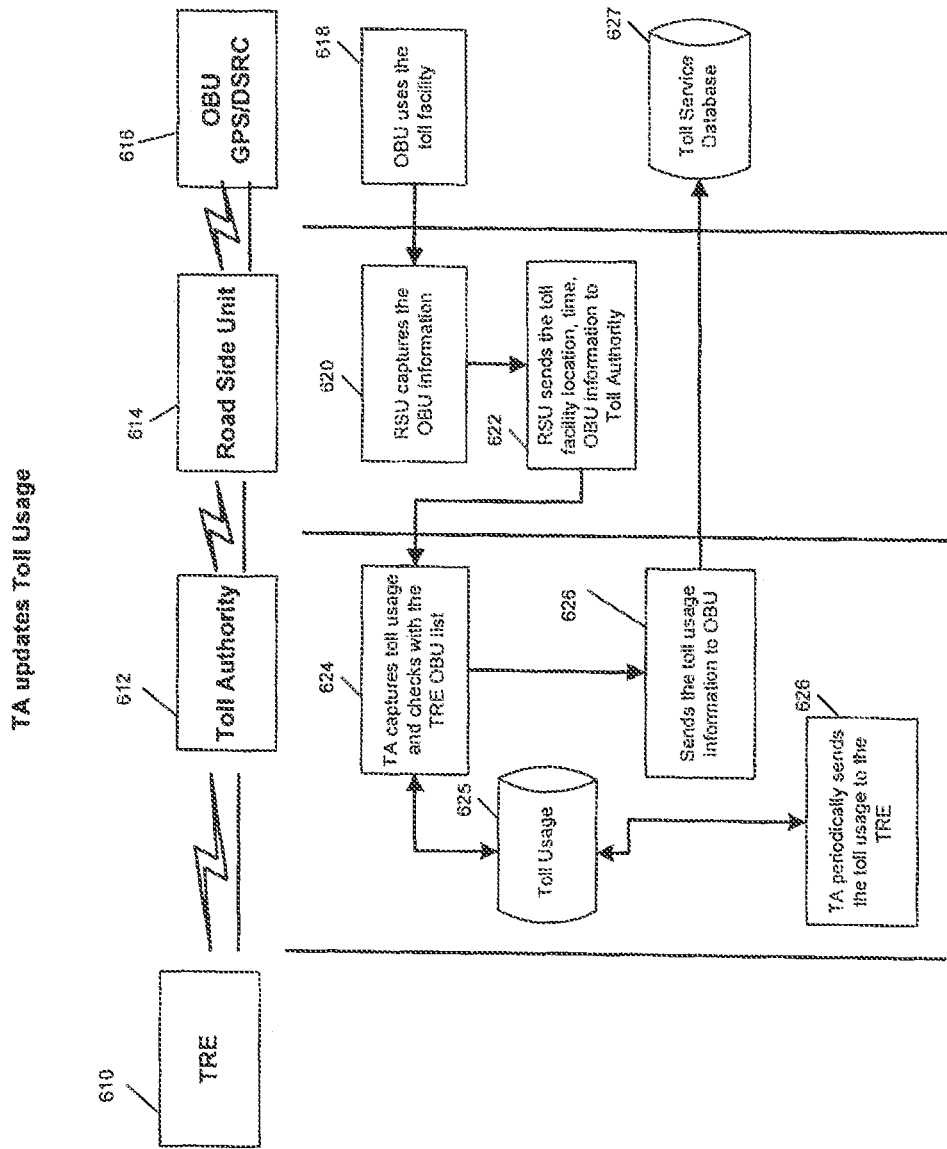
FIG. 6 illustrates a flow chart of a toll authority updating toll usage that includes an embodiment of the disclosure.

Referring now to FIG. 6, a flow chart of a toll authority updating toll usage 600 is depicted. Four entities are in communication, a toll rental entity 610, the toll authority 612, a road side unit 614 and an on board unit 616. The toll rental entity is typically a service provider, however it could be a rental car agency if the user is the third party entity. The toll authority is a government, quasi-government or private entity that is legally authorized to collect tolls. The third party transport would typically be a rental vehicle.

The OBU uses 618 the toll facility and a road side unit captures 620 the OBU information. The road side unit sends 622 the toll facility location, time, and OBU information to the toll authority. The toll authority captures 624 toll usage and checks with the toll rental entity on board unit list and stores 626 the information at the toll authority and sends 628 toll usage information to the on board unit, where it is stored 630 in the on board unit database. The toll authority periodically sends 632 the toll usage to the toll rental entity. The transfer of information occurs via at least one of a wireless protocol, a wired protocol and a combination of the wireless protocol and the wired protocol. The steps in the flow are performed by software, hardware, firmware, and/or the combination of software, hardware, and/or firmware.

Figure 7:
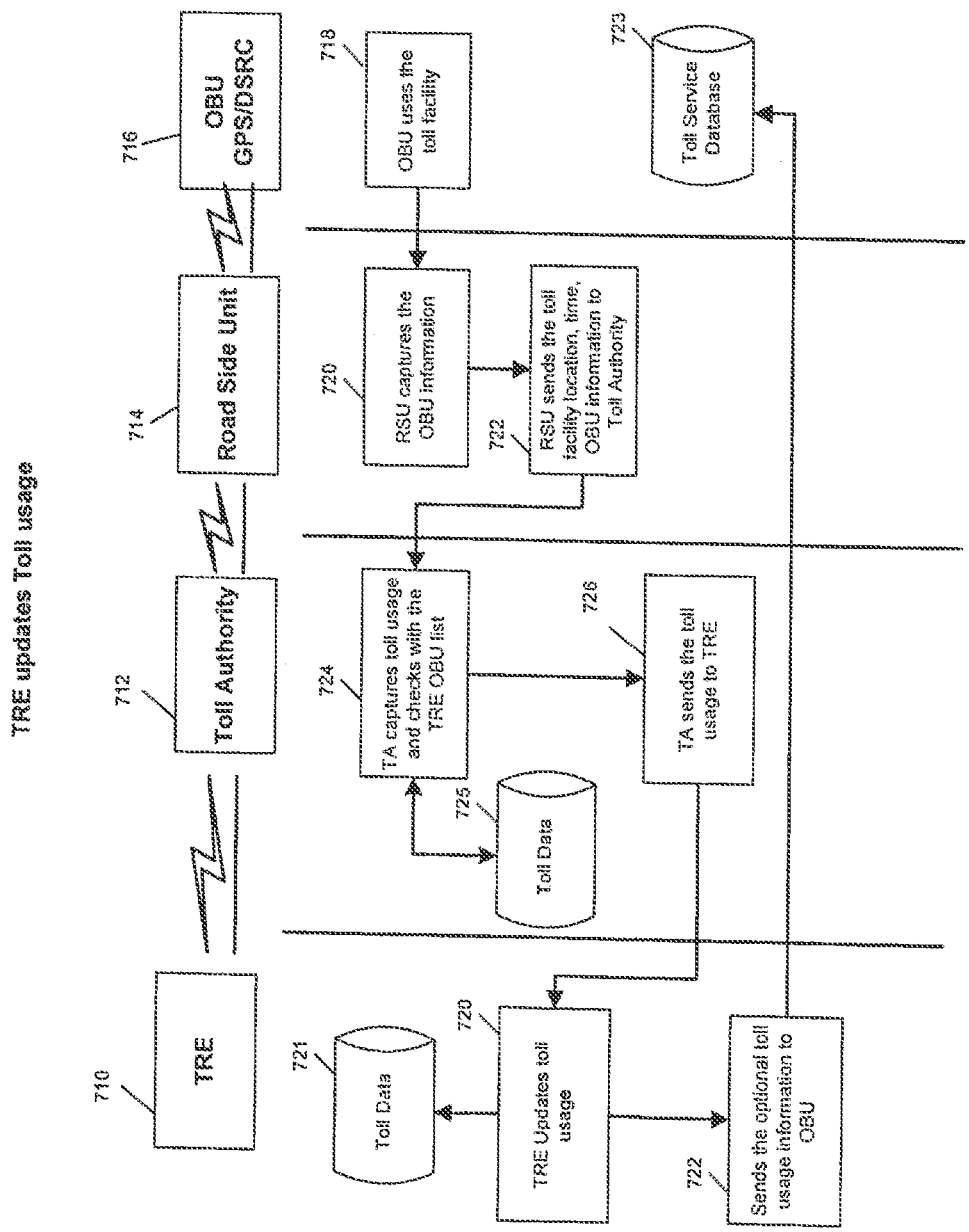
FIG. 7 illustrates a flow chart of the toll rental entity updating toll usage that includes an embodiment of the disclosure.

Referring now to FIG. 7, a flow chart of a toll rental entity updating toll usage 700 is depicted. Four entities are in communication, a toll rental entity 710, the toll authority 712, a road side unit 714 and an on board unit 716. The toll rental entity is typically a service provider, however it could be a rental car agency if the user is the third party entity. The toll authority is a government, quasi-government or private entity that is legally authorized to collect tolls. The third party transport would typically be a rental vehicle.

The OBU uses 718 the toll facility and a road side unit captures 720 the OBU information. The road side unit sends 722 the toll facility location, time, and OBU information to the toll authority. The toll authority captures 724 toll usage and checks with the toll rental entity on board unit list and stores 726 the information at the toll authority and sends 728 toll usage information to the toll rental entity. The toll rental entity updates 730 the toll usage and stores 732 the data. The toll rental entity sends 734 the optional toll usage information to the on board unit where it is stored 736 in a toll service database. The transfer of information occurs via at least one of a wireless protocol, a wired protocol and a combination of the wireless protocol and the wired protocol. The steps in the flow are performed by software, hardware, firmware, and/or the combination of software, hardware, and/or firmware.

Figure 8:
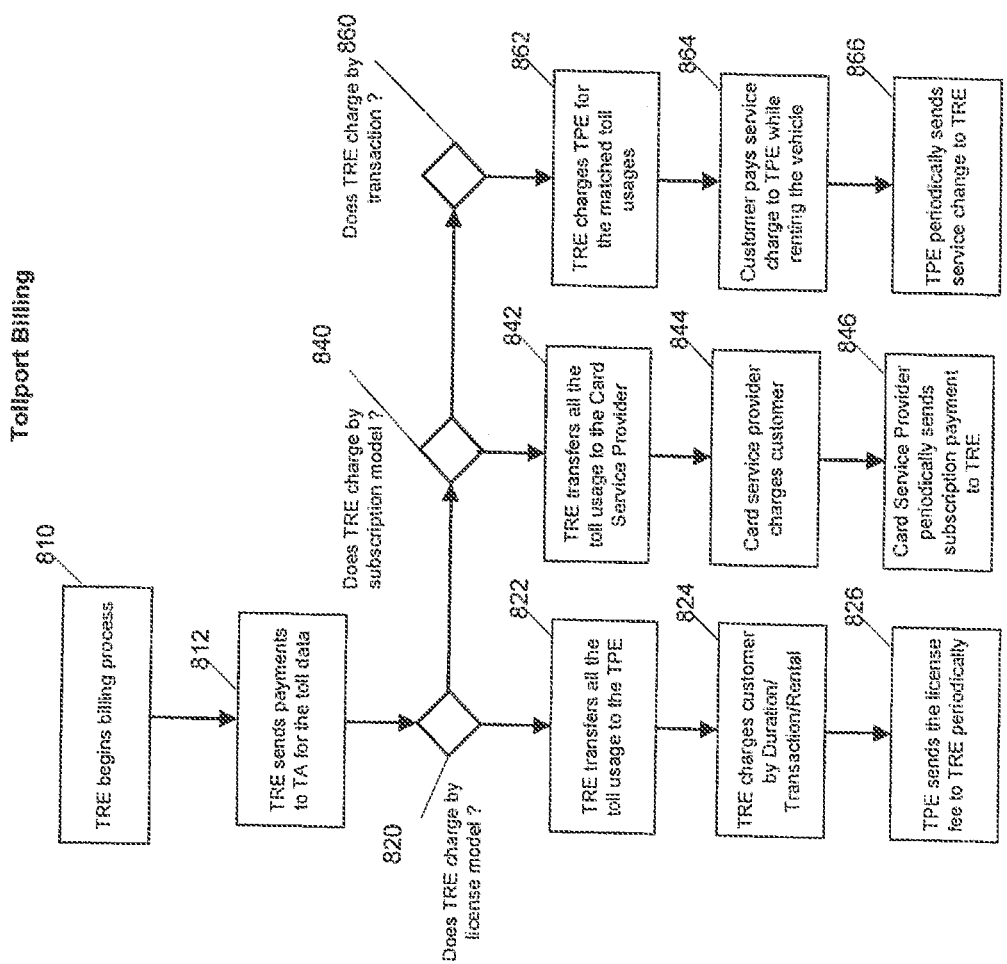
FIG. 8 illustrates billing a rented third party transport including an on board unit in accordance with an embodiment of the disclosure.

Referring now to FIG. 8, a flow chart of a toll rental entity billing 800 is depicted. The toll rental entity begins 810 the billing process and sends 812 payments to the toll authority for the toll data. The query is made 814 whether the toll rental entity charges by the license model. If it does then the toll rental entity transfers 816 the toll usage to the third party entity, charges 818 the customer by duration, transaction or rental and the third party entity sends 20 the license fee to the toll rental entity. The query is made 822 whether the toll rental entity charges by the subscription model. If yes the toll rental entity transfers 824 the toll usage to the card service provider and the card service provider charges 826 the customer and periodically sends 828 a subscription payment to the toll rental entity. The query is made 830 whether the toll rental entity charges by the transaction model. If yes the toll rental entity charges 832 the third party entity for the matched toll usage, the customer pays 834 a service charge to the third party entity while renting the vehicle and the third party entity periodically sends 836 the service charge to the toll rental entity. If no toll match is found the toll rental entity sends toll data to the third party entity. A determination is made as to whether the rental car agency pays for unsubscribed usage. If the car rental entity does pay for unsubscribed usage the third party entity collects payment and any service charges from the unsubscribed customer. The third party entity sends payment to the toll rental entity for unmatched tolls with service charges. The transfer of information occurs via at least one of a wireless protocol, a wired protocol and a combination of the wireless protocol and the wired protocol. The steps in the flow are performed by software, hardware, firmware, and/or the combination of software, hardware, and/or firmware.

Figure 9:
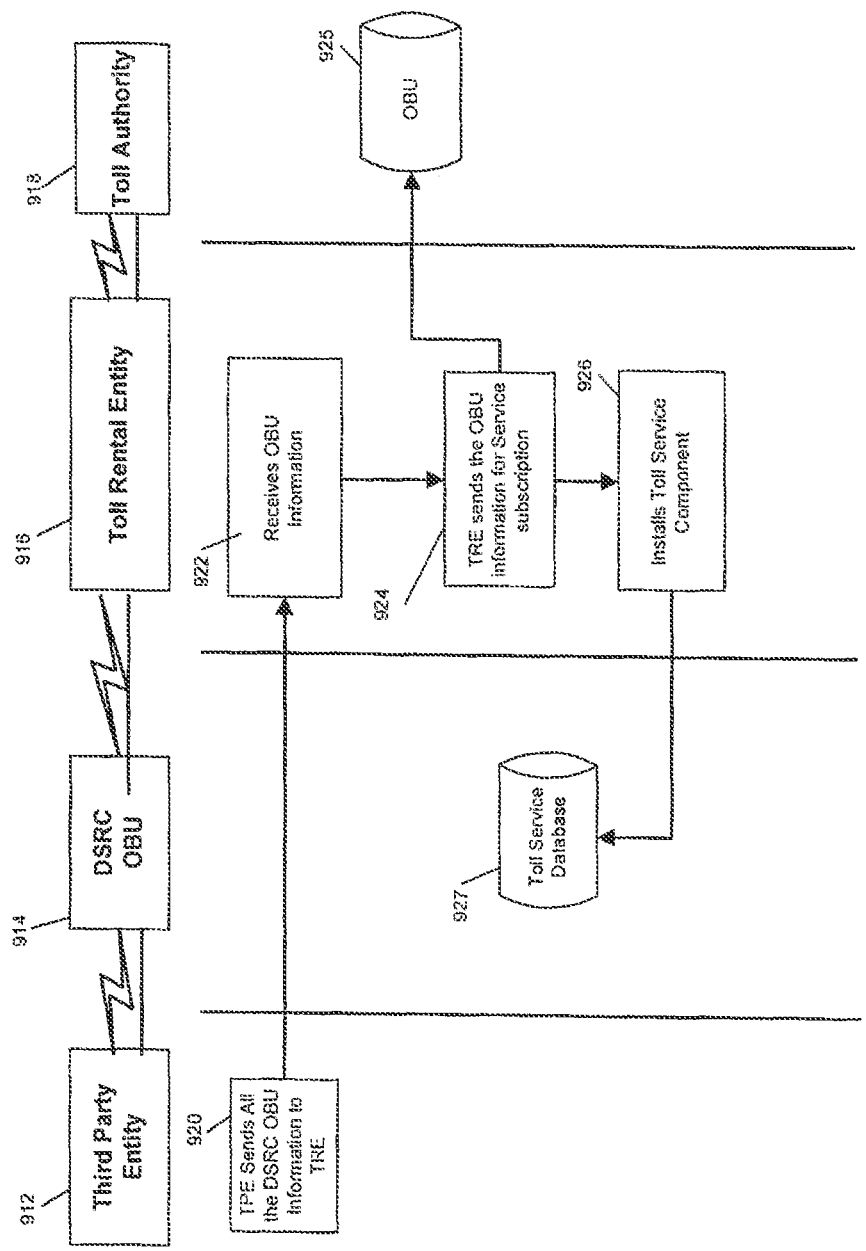
FIG. 9 illustrates a first flow chart of billing data transfer that includes an embodiment of the disclosure.

Referring now to FIG. 9, a flow chart of a billing 900 is depicted. Four entities are in communication a third party entity 912, an on board unit 914, a toll rental entity 916 and a toll authority 918. The third party entity sends 920 the on board unit information to the toll rental entity. The toll rental entity receives 922 the on board unit information and sends 924 the information for subscription service and installs 926 the toll service component on the on board unit. The on board unit receives and stores 928 the toll service component in the toll service database in the on board unit. The toll authority stores 930 the on board unit information. The transfer of information occurs via at least one of: a wireless protocol, a wired protocol and a combination of the wireless protocol and the wired protocol. The steps in the flow are performed by software, hardware, firmware, and/or the combination of software, hardware, and/or firmware.

Figure 10:
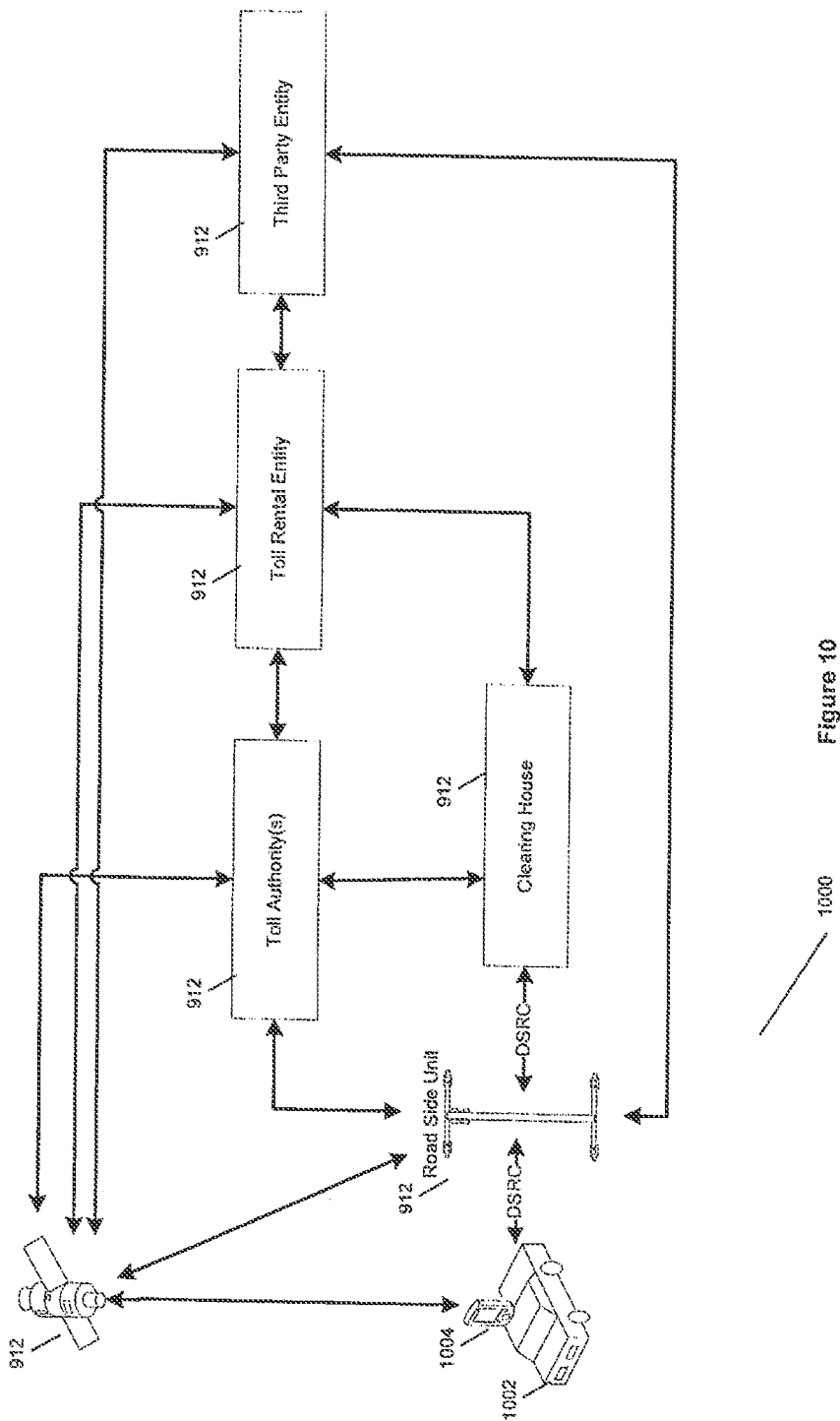
FIG. 10 illustrates a first system overview of billing a rented third party transport including an on board unit in accordance with an embodiment of the disclosure.

Referring now to FIG. 10, a first system overview of billing a rented third party entity transport including an on board unit 1000 is depicted. A satellite 1010 is in communication with a toll authority 1012, a toll rental entity 1014 and a third party entity 1016. A third party transport 1018 has an on board unit 1020 in communication with the satellite and a road side unit 1022 which communicates with the on board unit by DSRC. A clearing house 1024 captures the data from the road side unit the toll authority and the toll renal entity. The third party entity communicates with the road side unit. The transfer of information occurs via at least one of: a wireless protocol a wired protocol and a combination of the wireless protocol and the wired protocol. The steps in the flow are performed by software, hardware, firmware, and/or the combination of software, hardware, and/or firmware.

Figure 11:
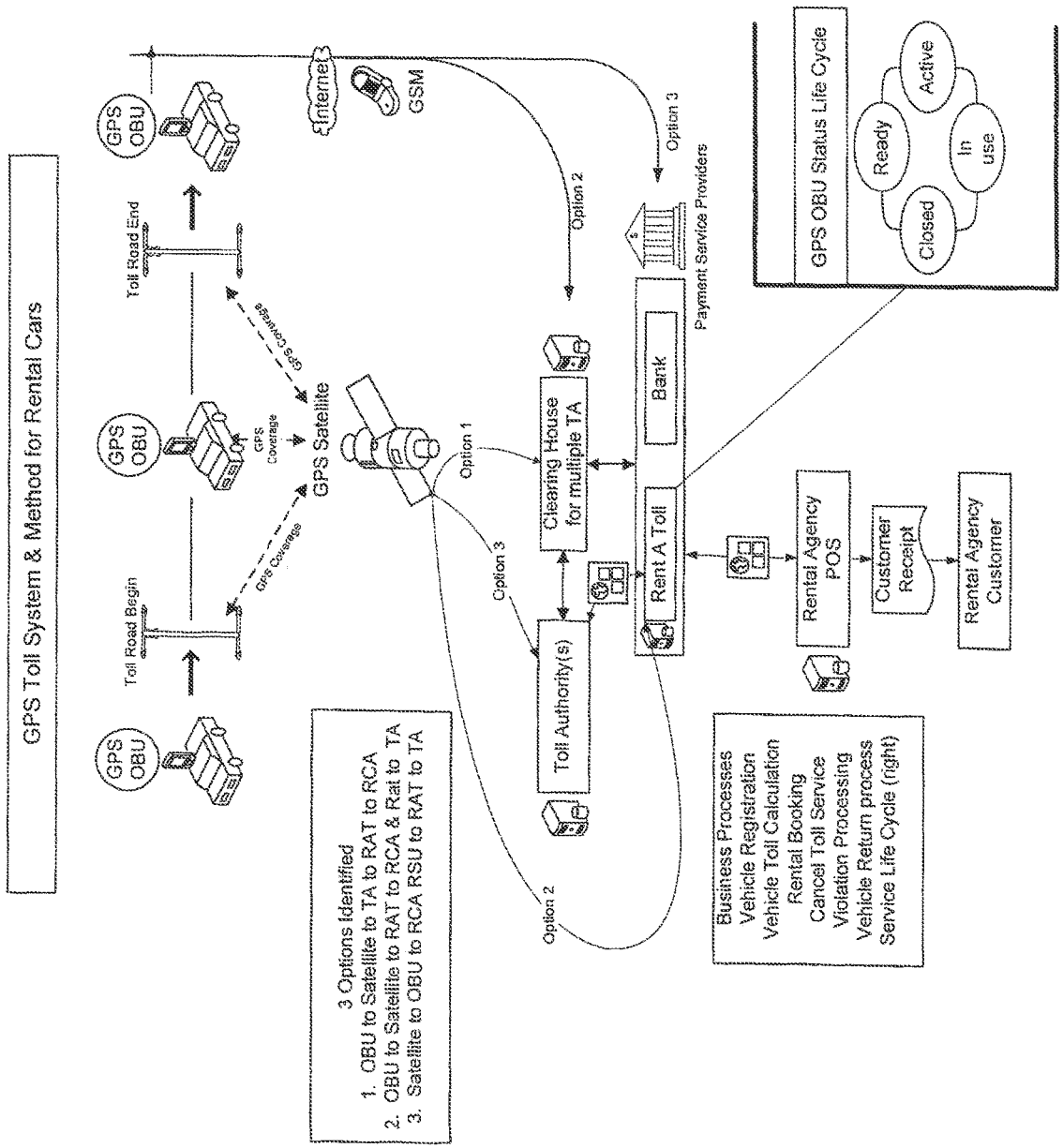
FIG. 11 illustrates a second system overview of billing a rented third party transport including an on board unit in accordance with an embodiment of the disclosure.

Referring now to FIG. 11, a second system overview of billing a rented third party entity transport including an on board unit 1100 is depicted. Vehicles equipped with on board units 1110, 1112 and 1114 traverse a toll road and the on board units receive position data from a GPS satellite 1116. The on board unit data can also be transmitted by the Internet 1118 and GSM cell phone 1120. Three options 1122 are available for tracking, the first is OBU to GPS to toll rental entity to rental car agency, the second is OBU to GPS to toll rental entity to rental car agency or toll authority and the third is GPS to OBU to rental car agency road side unit to toll rental entity to toll authority. The toll authority 1124 communicates with a clearing house 1126 for multiple toll authorities. The clearing house communicates with the toll rental entity 1128 or a bank 1130, 1132. The toll rental entity communicates with a rental agency point of sale 1136 system which generates a customer receipt 1138 for the rental agency customer 1140. The on board unit status life cycle 1142 is ready 1144, active 1146, in use 1148 and closed 1150. The transfer of information occurs via at least one of: a wireless protocol a wired protocol and a combination of the wireless protocol and the wired protocol. The steps in the flow are performed by software, hardware, firmware, and/or the combination of software, hardware, and/or firmware.

Figure 12:
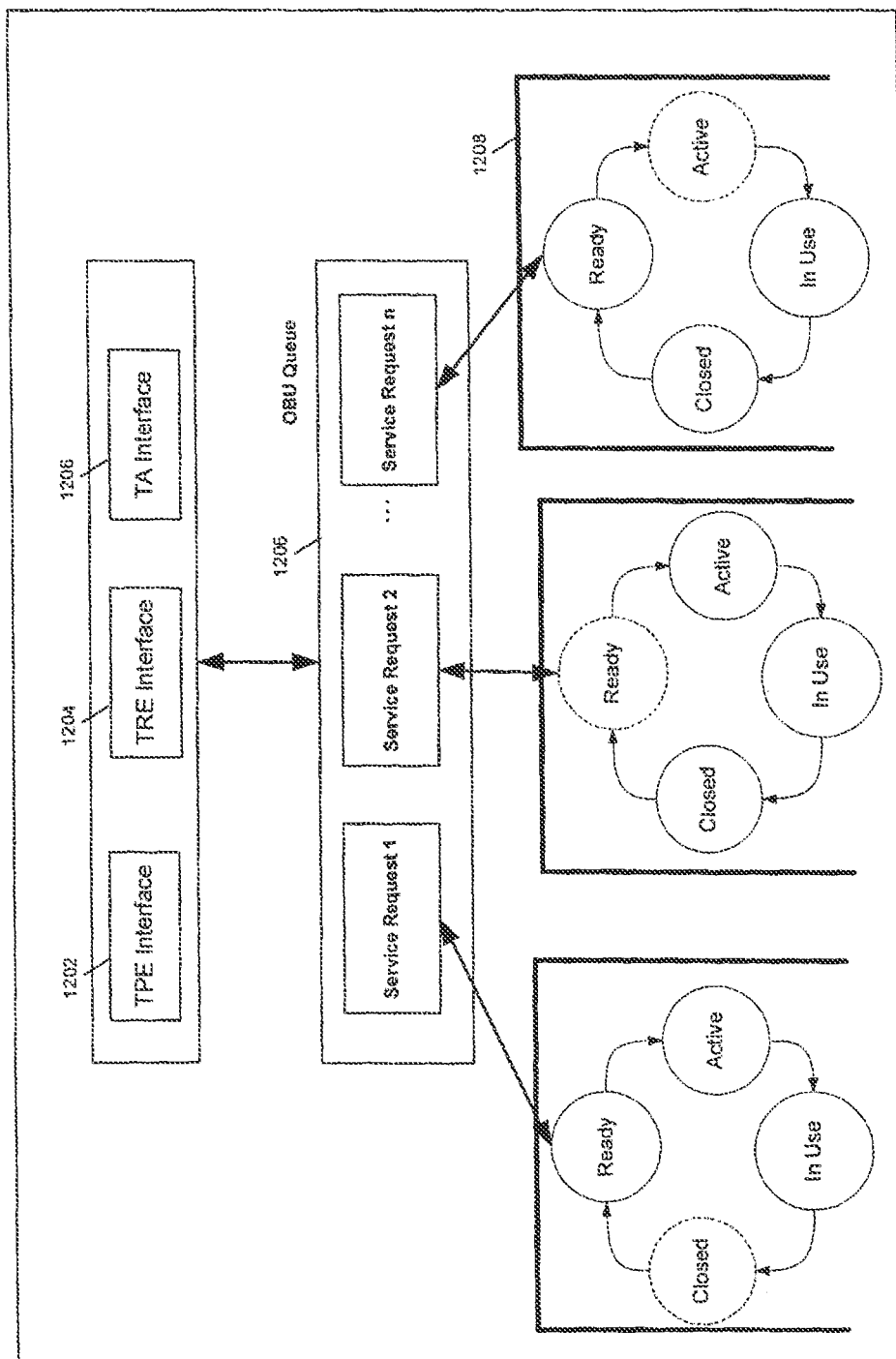
FIG. 12 illustrates a second flow chart of billing data transfer that includes an embodiment of the disclosure.

Referring now to FIG. 12, a second flow chart of billing data transfer 1200 is depicted. A third party entity interface 1202, toll rental entity interface 1204 and toll authority interface 1206 process a set of toll service requests 1208 in queue. The toll service requests interact with on board units in some portion of their life cycle 1210, ready, active, in use and closed. The on board unit queue, transfers information to and from the on board unit to update software and to upload and download toll data. The transfer of information occurs via at least one of a wireless protocol a wired protocol and a combination of the wireless protocol and the wired protocol. The steps in the flow are performed by software, hardware, firmware, and/or the combination of software, hardware, and/or firmware.

Although an exemplary embodiment of the system of the embodiment of the disclosure has been illustrated in the accompanied drawings and described in the foregoing detailed description, it will be understood that the embodiment of the disclosure is not limited to the embodiments disclosed, but is capable of numerous rearrangements, modifications, and substitutions without departing from the spirit of the embodiment of the disclosure as set forth and defined by the following claims. For example, the capabilities of the embodiment of the disclosure can be performed fully and/or partially by one or more of the processors or memories. Also, these capabilities may be performed in the current manner or in a distributed manner and on, or via, any device able to provide and/or receive information. Further, although depicted in a particular manner, various modules or blocks may be repositioned without departing from the scope of the current embodiment of the disclosure. Still further, although depicted in a particular manner, a greater or lesser number of modules and connections can be utilized with the embodiment of the disclosure in order to accomplish the embodiment of the disclosure, to provide additional known features to the embodiment of the disclosure, and/or to make the embodiment of the disclosure more efficient. Also, the information sent between various modules can be sent between the modules via at least one of a data network, the Internet, an Internet Protocol network, a wireless source, and a wired source and via plurality of protocols.

What is claimed is:

1. A method for providing toll service to a transport user, the method comprising:
    installing a toll service software on a wireless communication device comprising global position system (GPS) capability;
    wherein the wireless communication device comprises a memory communicably coupled to a processor and a network interface for wireless communications;
    providing, via an interface of the wireless communication device, a toll service option to a transport user; and
    responsive to acceptance of the toll service option by the transport user:
        activating the wireless communication device to function as a toll service device and for communication with a toll authority computer that is located at a remote position relative to a toll road,
        receiving, at the wireless communication device, a position signal from a GPS satellite for the wireless communication device that is located in a vehicle,
        transmitting position data of the position signal from the wireless communication device that is located in the vehicle to the toll authority computer that is remote from the toll road via a cellular communication network,
        converting the position signal for the wireless communication device that was received from the GPS satellite to a toll usage data that indicates the vehicle has traversed the toll road based on the position signal from the GPS satellite for the wireless communication device,
        storing the toll usage data in a toll service database, and
        sending the toll usage data from the toll service database to a payment interface to bill the transport user and provide a toll receipt.

2. The method of claim 1, wherein the wireless communication device comprising GPS capability receives position data from the GPS satellite.

3. The method of claim 1, wherein the toll authority computer synchronizes the toll usage data with the wireless communication device, and the wireless communication device stores updated toll usage data from the toll authority computer.

4. The method of claim 1, wherein activating the wireless communication device to function as the toll service device comprises is performed by receiving activation information from the transport user via the wireless communication device, and sending the activation information to the toll authority computer.

5. The method of claim 1, further comprising sending a deactivation signal to the wireless communication device; and
wherein, upon receiving the deactivation signal, the wireless communication device discontinues communication with the toll authority computer.

6. The method of claim 1, wherein the interface of the wireless communication device provides an option for the transport user to close a transaction directly from the wireless communication device.

7. The method of claim 1, wherein the communication between the wireless communication device and the toll authority computer is transmitted wirelessly via the internet.

8. A wireless communication device comprising:
a processor;
a network interface for wireless communications
a global position system (GPS) unit; and
a memory storing instructions that, when executed by the processor, configure the wireless communication device to:
install a toll service software on the wireless communication device;
provide, via an interface of the wireless communication device, a toll service option to a transport user; and
responsive to acceptance of the toll service option by the transport user:
activate the wireless communication device to function as a toll service device and for communication with a toll authority computer that is located at a remote position relative to a toll road,
receive, at the wireless communication device, a position signal from a GPS satellite for the wireless communication device that is located in a vehicle,
transmit position data of the position signal from the wireless communication device that is located in the vehicle to the toll authority computer that is remote from the toll road via a cellular communication network,
convert the position signal for the wireless communication device that was received from the GPS satellite to a toll usage data that indicates the vehicle has traversed the toll road based on the position signal from the GPS satellite for the wireless communication device,
store the toll usage data in a toll service database, and
send the toll usage data from the toll service database a payment interface to bill the transport user and provide a toll receipt.

9. The wireless communication device of claim 8, wherein the wireless communication device receives position data from a GPS satellite.

10. The wireless communication device of claim 8, wherein the toll authority computer synchronizes the toll usage data with the wireless communication device, and the wireless communication device stores updated toll usage data from the toll authority computer.

11. The wireless communication device of claim 8, wherein activating the wireless communication device to function as the toll service device comprises is performed by receiving activation information from the transport user via the wireless communication device, and sending the activation information to the toll authority computer.

12. The wireless communication device of claim 8, wherein the wireless communication device is further configured to receive a deactivation signal; and
wherein, upon receiving the deactivation signal, the wireless communication device discontinues communication with the toll authority computer.

13. The wireless communication device of claim 8, wherein the interface of the wireless communication device provides an option for the transport user to close a transaction directly from the wireless communication device.

14. The wireless communication device of claim 8, wherein the communication between the wireless communication device and the toll authority computer is transmitted wirelessly via the internet.

15. A system for providing transport users an option for toll service, the system comprising:
a toll authority computer that is located at a remote position relative to a toll road; and
a wireless communication device comprising:
a processor;
a network interface for wireless communications
a global position system (GPS) unit; and
a memory storing instructions that, when executed by the processor, configure the wireless communication device to:
install a toll service software on the wireless communication device;
provide, via an interface of the wireless communication device, a toll service option to a transport user; and
responsive to acceptance of the toll service option by the transport user:
activate the wireless communication device to function as a toll service device and for communication with the toll authority computer that is located at a remote position relative to the toll road,
receive, at the wireless communication device, a position signal from a GPS satellite for the wireless communication device that is located in a vehicle,
transmit position data of the position signal from the wireless communication device that is located in the vehicle to the toll authority computer that is remote from the toll road via a cellular communication network,
convert the position signal for the wireless communication device that was received from the GPS satellite to a toll usage data that indicates the vehicle has traversed the toll road based on the position signal from the GPS satellite for the wireless communication device,
store the toll usage data in a toll service database, and
send the toll usage data from the toll service database a payment interface to bill the transport user and provide a toll receipt.

16. The wireless communication device of claim 15, wherein the wireless communication device receives position data from the GPS satellite.

17. The wireless communication device of claim 15, wherein the toll authority computer synchronizes the toll usage data with the wireless communication device, and the wireless communication device stores updated toll usage data from the toll authority computer.

18. The wireless communication device of claim 15, wherein activating the wireless communication device to function as the toll service device comprises is performed by receiving activation information from the transport user via the wireless communication device, and sending the activation information to the toll authority computer.

19. The wireless communication device of claim 15, wherein the wireless communication device is further configured to receive a deactivation signal; and
  wherein, upon receiving the deactivation signal, the wireless communication device discontinues communication with the toll authority computer.

20. The wireless communication device of claim 15, wherein the interface of the wireless communication device provides an option for the transport user to close a transaction directly from the wireless communication device.

* * * * *